United States Patent
Plesniak et al.

(10) Patent No.: US 10,895,316 B2
(45) Date of Patent: Jan. 19, 2021

(54) SLEW DRIVE WITH DUST COVER AND TORQUE TRANSDUCTION

(71) Applicants: Adam Plesniak, Huntington beach, CA (US); Mark Henderson, La Verne, CA (US)

(72) Inventors: Adam Plesniak, Huntington beach, CA (US); Mark Henderson, La Verne, CA (US)

(73) Assignee: Kinematics, LLC., Phoenix, AZ (US)

( * ) Notice: Subject to any disclaimer, the term of this patent is extended or adjusted under 35 U.S.C. 154(b) by 30 days.

(21) Appl. No.: 16/012,689

(22) Filed: Jun. 19, 2018

(65) Prior Publication Data
US 2019/0024764 A1 Jan. 24, 2019

Related U.S. Application Data

(60) Provisional application No. 62/522,442, filed on Jun. 20, 2017, provisional application No. 62/575,131, filed on Oct. 20, 2017.

(51) Int. Cl.
*F16H 57/039* (2012.01)
*H02S 20/32* (2014.01)

(52) U.S. Cl.
CPC .......... *F16H 57/039* (2013.01); *H02S 20/32* (2014.12)

(58) Field of Classification Search
CPC .............. F16H 57/039; F16H 57/025; F16H 2025/2031; H02K 7/081; H02S 20/32; Y10T 74/2186; Y10T 74/2188
See application file for complete search history.

(56) References Cited

U.S. PATENT DOCUMENTS

| | | | | |
|---|---|---|---|---|
| 6,237,863 B1* | 5/2001 | Smith | .................. | A01G 25/092 239/722 |
| 8,453,328 B2* | 6/2013 | Kats | ........................ | H02S 20/32 29/890.033 |
| 9,074,797 B2* | 7/2015 | Miller | .................... | G01S 3/7861 |
| 2008/0026857 A1* | 1/2008 | Grazia | .............. | B29C 45/14065 464/178 |
| 2013/0239722 A1* | 9/2013 | Vollner | .................... | B66C 23/84 74/416 |
| 2014/0216522 A1* | 8/2014 | Au | .......................... | H02S 20/32 136/246 |
| 2015/0082923 A1* | 3/2015 | Morgan | ................. | F16H 57/039 74/89.14 |
| 2015/0300479 A1* | 10/2015 | Frank | ..................... | F16H 57/021 324/207.2 |

* cited by examiner

*Primary Examiner* — Bobby Rushing, Jr.
(74) *Attorney, Agent, or Firm* — Parsons & Goltry; Robert Parsons; Michael Goltry

(57) ABSTRACT

A single axis driving system includes a housing with a central portion defining a cavity and a pair of parallel spaced apart flanges formed as an integral part. Coaxial openings are formed through the flanges to define a mounting structure for an axle rotatably mounted in the coaxial openings. An opening is formed between the flanges in the surface of the central portion extending into the cavity. A gear plate is affixed to the axle and positioned to extend through the opening into the cavity for limited rotation with the axle. The gear plate has an arcuate set of gear teeth positioned along a periphery thereof. A driving gear is rotatably mounted in the housing so as to mesh with the arcuate set of gear teeth and a drive motor is mounted on the housing and attached to the driving gear for rotation of the driving gear.

21 Claims, 18 Drawing Sheets

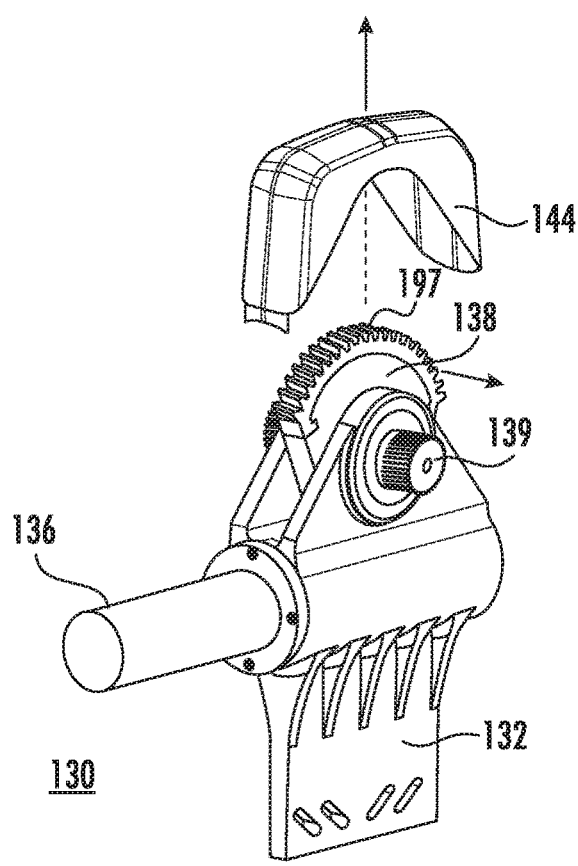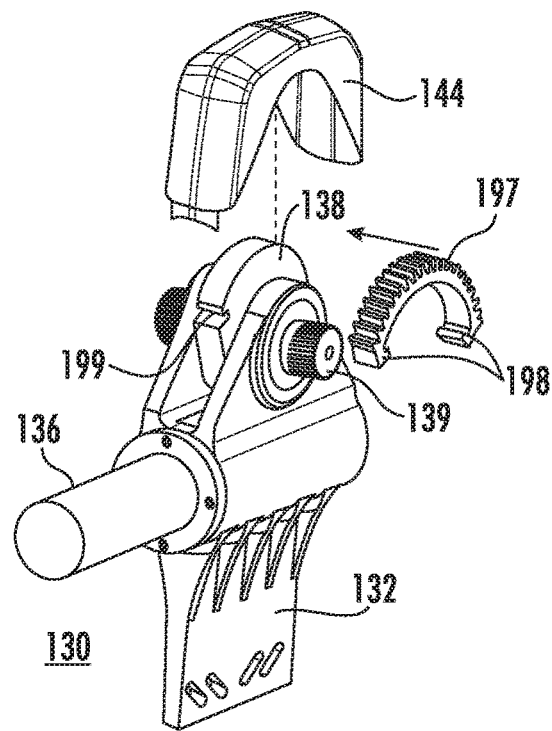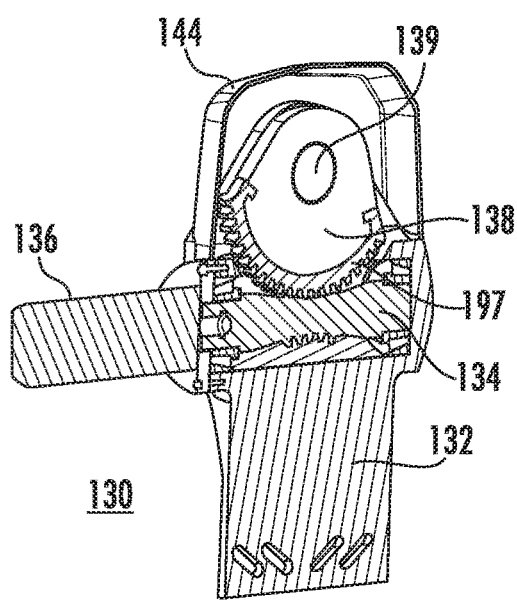
FIG. 14A
FIG. 14B
FIG. 14C

SLEW DRIVE WITH DUST COVER AND TORQUE TRANSDUCTION

CROSS-REFERENCE TO RELATED APPLICATION

This application claims the benefit of U.S. Provisional Patent Application No. 62/522,442, filed 20 Jun. 2017 and Provisional Patent Application No. 62/575,131, filed 20 Oct. 2017.

FIELD OF THE INVENTION

This invention relates to slew drives and more specifically to a slew drive with dust cover and torque transduction.

BACKGROUND OF THE INVENTION

Slew drives are mechanical actuators which take input motion from an input gear or worm and rotates, generally at low speeds, an output gear of larger size in order to accomplish an intended continuous or partial radial motion. For example, a slew drive can be used in a single axis solar tracker which is a device that holds PV panels (panels of photovoltaic sensors) and rotates the panels from east to west throughout the day to increase the output of electrical energy from the panels and reduce cosine loss.

At present, one of the main slew drives used in single axis solar trackers is known as a standard HE8 drive. The HE8 drive is a large assembly that is very robust and is useful for applications that have a large, non-balanced overturning moment and/or large unbalanced axial moment. The HE8 drives were developed from slew drives used in the mobile crane industry which require these characteristics. The robust construction and the ability to overcome these moments and forces results in additional expense, increasing the cost of the device. In many applications, this functionality is not required and simply adds to cost.

It would be highly advantageous, therefore, to remedy this and other deficiencies inherent in the prior art.

Accordingly, it is an object of the present invention to provide a new and improved slew drive that is less expensive than current types.

It is another object of the present invention to provide a new and improved slew drive with included maintenance and force transferring devices.

It is another object of the present invention to provide a new and improved slew drive with optional drive features.

It is another object of the present invention to provide a new and improved drive assembly that is less expensive than prior art drives.

It is another object of the present invention to provide a new and improved drive assembly especially useful as a solar tracker slew drive.

It is another object of the present invention to provide a new and improved drive assembly with reduced over turning moment.

SUMMARY OF THE INVENTION

Briefly to achieve the desired objects and advantages of the instant invention a single axis driving system is provided including a housing with a central portion defining a cavity and a pair of parallel spaced apart flanges formed as an integral part of the central portion and extending outwardly therefrom, each flange having an opening formed therethrough so as to be coaxial and to define a mounting structure for an output axle, an opening formed between the parallel spaced apart flanges in the surface of the central portion of the housing, the opening extending into the cavity in the housing, and a mounting portion extending outwardly from the central portion. An output axle is rotatably mounted in the coaxial openings through the parallel spaced apart flanges. A gear plate is affixed to the axle and positioned to extend through the opening formed between the parallel spaced apart flanges into the cavity in the housing for limited rotation with the output axle, the gear plate having an arcuate set of gear teeth positioned along a periphery thereof. A driving gear is rotatably mounted in the housing so as to mesh with the arcuate set of gear teeth on the gear plate in the cavity in the housing and a drive motor is mounted on the housing and attached to the driving gear for rotation of the driving gear, whereby the gear plate and attached output axle are rotated in response to rotation of the drive motor.

The desired objects and advantages of the instant invention are further achieved in a preferred embodiment of a single axis driving system including a housing with a central portion defining a cylindrically shaped cavity and a pair of parallel spaced apart flanges formed as an integral part of the central portion and extending outwardly therefrom, each flange having an opening formed therethrough so as to be coaxial and to define a mounting structure for an output axle, an opening formed between the parallel spaced apart flanges in the surface of the central portion of the housing, the opening extending into the cavity in the housing, and a mounting portion extending outwardly from the central portion. An output axle is rotatably mounted in the coaxial openings through the parallel spaced apart flanges. A gear plate is affixed to the axle and positioned to extend through the opening formed between the parallel spaced apart flanges into the cavity in the housing for limited rotation with the output axle, the gear plate having an arcuate set of gear teeth positioned along a periphery thereof. A worm gear is rotatably mounted in the cylindrical cavity of the housing so as to mesh with the arcuate set of gear teeth on the gear plate in the cavity in the housing and a drive motor is mounted on the housing and attached to the worm gear for rotation of the worm gear and the gear plate, whereby the gear plate and attached output axle are rotated in response to rotation of the drive motor.

The desired objects and advantages of the instant invention are further achieved in a preferred embodiment of a single axis driving system including a housing with a central portion defining a cavity and a pair of parallel spaced apart flanges formed as an integral part of the central portion and extending outwardly therefrom, each flange having an opening formed therethrough so as to be coaxial and to define a mounting structure for an output axle, an opening formed between the parallel spaced apart flanges in the surface of the central portion of the housing, the opening extending into the cavity in the housing, and a mounting portion extending outwardly from the central portion. An output axle is rotatably mounted in the coaxial openings through the parallel spaced apart flanges. A gear plate is affixed to the axle and positioned to extend through the opening formed between the parallel spaced apart flanges into the cavity in the housing for limited rotation with the output axle, the gear plate having an arcuate set of gear teeth positioned along a periphery thereof. A spur gear is rotatably mounted in the housing so as to mesh with the arcuate set of gear teeth on the gear plate in the cavity in the housing and a drive motor is mounted on the housing and attached to the spur gear for rotation of the spur gear and the gear plate, whereby the gear plate and attached output axle are rotated in response to rotation of the drive motor.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIGS. 14A, 14B and 14C illustrate replaceable components for maintenance of the present slew drive illustrated in FIG. 2B;

DETAILED DESCRIPTION OF THE DRAWINGS

Figure 1:
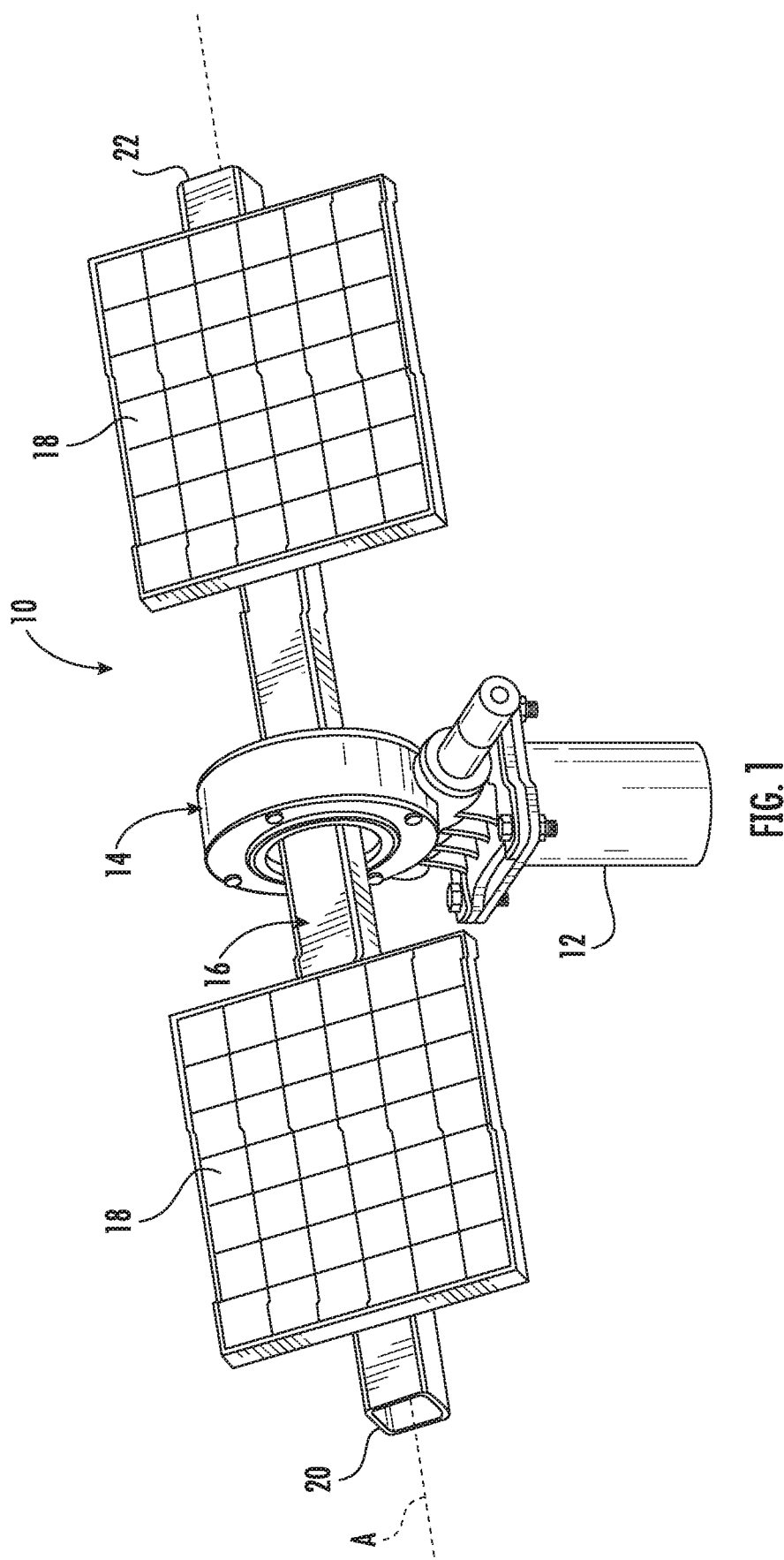
FIG. 1 is a perspective view of a generic solar panel assembly illustrating the various components and relative positions.

Turning to FIG. 1, a generic solar panel assembly, generally designated 10, is provided to illustrate a possible background or surroundings for the present slew drive. Assembly 10 includes a support post 12, a slew drive 14 carried by post 12, a transverse support member 16 extending through and rotated by slew drive 14, and solar panels 18 carried by transverse support member 16. Transverse support member 16 is mounted for rotation about a longitudinal axis A. It will be understood that while transverse support member 16 is illustrated as tubular for convenience in understanding, in the present invention it will be constructed to attach to output collars illustrated in the remaining figures and described in detail below. Transverse support member 16 is carried by slew drive 14 (simplified in this view for convenience in understanding) at a midpoint between ends 20 and 22 to provide a weight balance between the ends. This, however, is not required, as a "balanced" single axis tracker generally has a curved transverse support member 16 which aligns the center of mass of the tracker torque tube panels with the center of rotation of the drive. Also, end 20 and 22 of FIG. 1 are likely in practice to be supported by hinged connections on posts similar to 12, which translates force back down to the ground. Solar panels 18 are coupled to transverse support member 16 intermediate slew drive 16 and end 20, and intermediate slew drive 16 and end 22. It will be understood by those skilled in the art that the entire assembly is oriented with axis A generally extending north and south (depending upon the geographical location). By rotating transverse support member 16 around longitudinal axis A, solar panels 18 can be adjusted to face the sun as it moves through the daytime sky, maximizing energy conversion. It will be understood by those of ordinary skill in the art that a slew drive according to the present invention can be used in other applications.

Figure 2A:
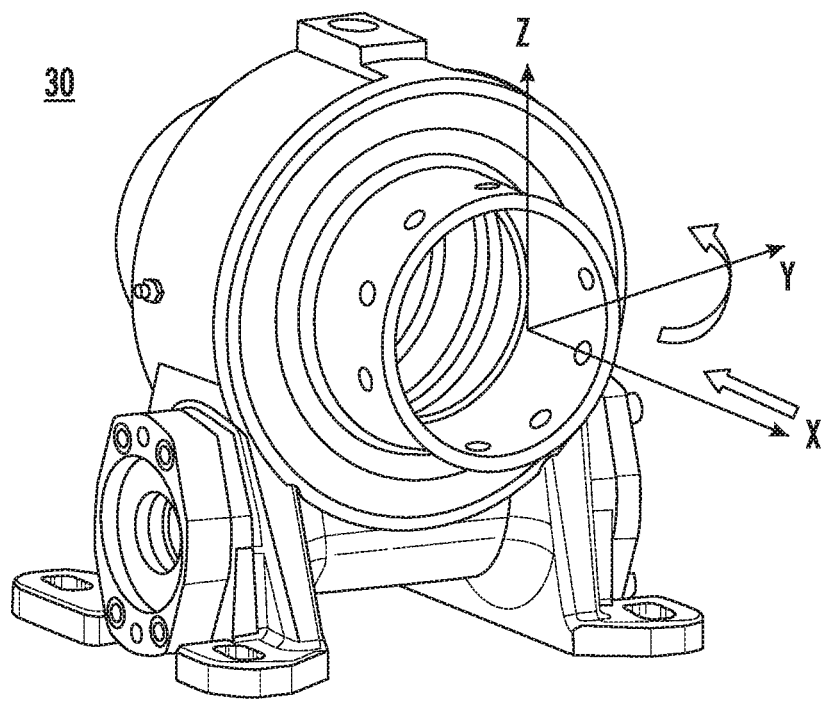
FIGS. 2A and 2B illustrate a standard slew drive and a slew drive in accordance with the present invention, respectively.

Turning now to FIG. 2A, a standard HE8 slew drive generally referred to as slew drive 28 is illustrated. Slew drive 28 is constructed relatively large and rugged with a completely enclosed housing so that maintenance is difficult and modifications generally are made only during production. Slew drive 28 is capable of overcoming large non-balanced overturning moment Y and non-balanced axial force X due to its robust structure and wide footprint.

Figure 2B:
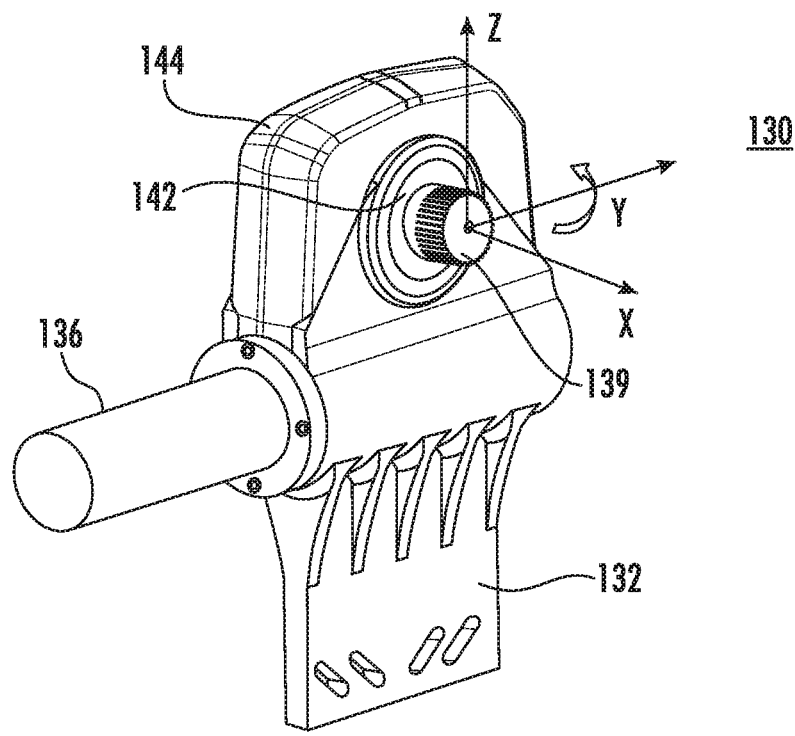

Referring to FIG. 2B, a slew drive, generally designated 130, is illustrated. Slew drive 130, as can be seen from the figures, is generally smaller and simpler to produce and use than prior art slew drives. While a wide variety of different torques can be provided as desired, slew drive 130 produces a nominal torque of 100-7000 NM with an ultimate torque of 1000 NM to 30 kNM. This is sufficient in many areas where the drives are not subject to large overturning moments or axial forces and are especially useful in solar trackers.

Figure 3:
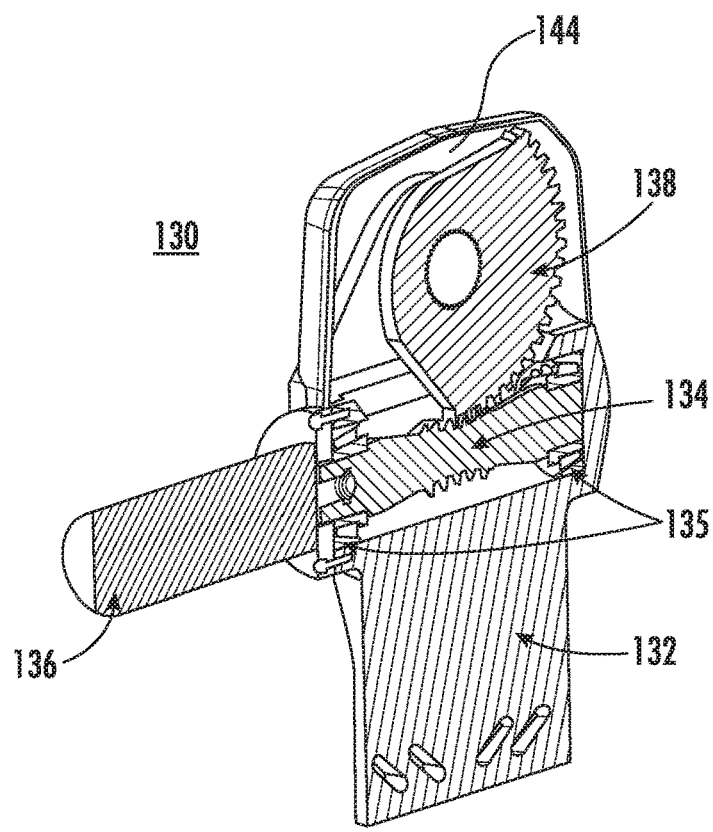
FIG. 3 illustrate a cross-sectional view in perspective of the present slew drive, showing the internal gear assembly.
Figure 4:
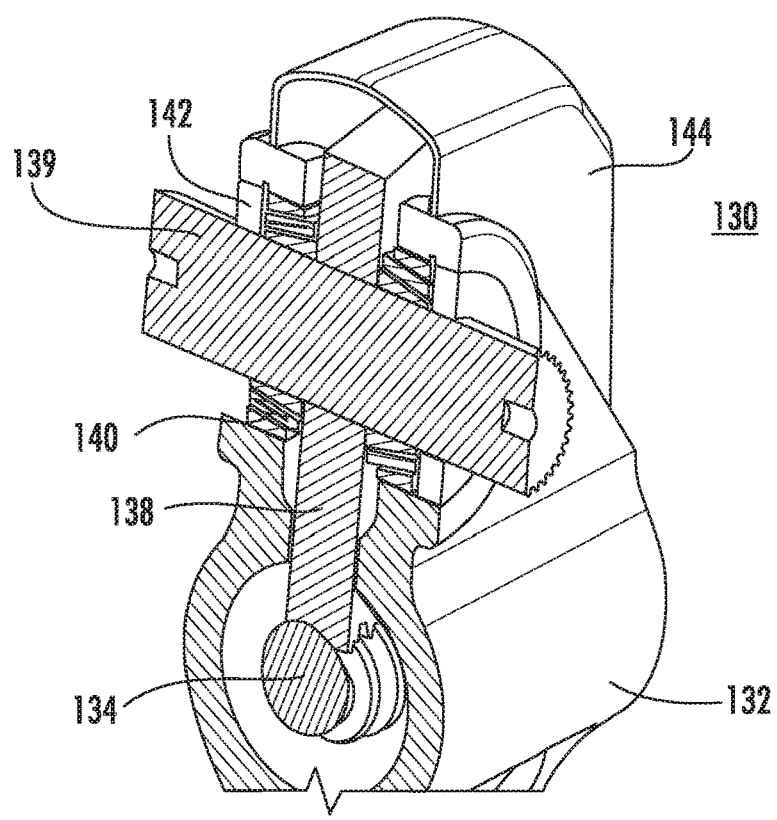
FIG. 4 illustrate a cross-sectional view in perspective, perpendicular to the cross-sectional view in FIG. 3, showing another view of the internal gear assembly.

Referring additionally to FIGS. 3 and 4, it can be seen that slew drive 130 includes a housing 132, a driving gear, which in this example is worm gear 134, mounted for rotation in housing 132 by bearings 135 and driven by a motor 136, a gear plate 138 positioned in housing 132 for meshing with worm gear 134 and rotating an axle 139, which provides the rotary output desired. Axle 139 is mounted for rotation in housing 132 by bearings 140 which are protected from the atmosphere by dust/oil seals 142. It will be understood that various types of bearings 140 can be employed, such as sliding bearing and the like. A dust cover 144 is removably engaged with housing 132 so as to cover and protect gear plate 138 along with oil seals 142, bearings 140 and portions of housing 132. Dust cover 144 is preferably made of plastic and may be, for example, either injection molded or thermal molded. While a plastic dust cover 144 is preferred, other materials such as thin metal sheathing like aluminum or cast metal can also be employed. It will be understood that dust cover 144 can be fabricated of various materials, but is simply intended as a cover and is not intended to provide structural rigidity or support to the device.

Figure 5:
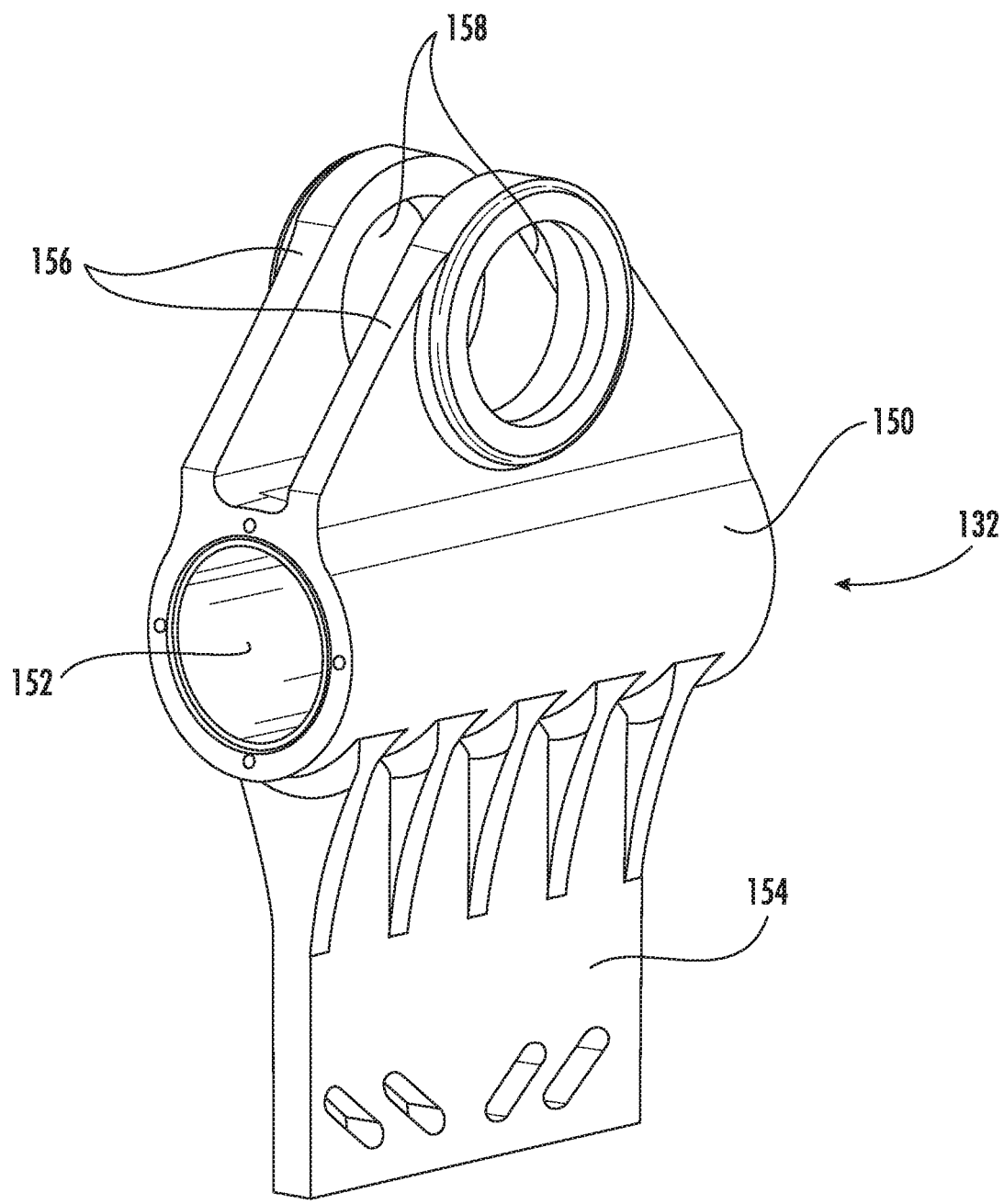
FIGS. 5, 6A, 6B, 7A, 7b, 8a and 8B illustrate steps in the assembly of the present slew drive illustrated in FIG. 2B.

Referring now to FIGS. 5, 6A, 6B, 7A, 7b, 8a, and 8B steps in the assembly of slew drive 130 are illustrated. In FIG. 5 housing 132 is shown to include a central cylindrical portion 150 defining a longitudinally extending worm gear cavity 152. In this example, a slew drive mounting portion 154 extends downwardly from central cylindrical portion 150 and is designed to mount slew drive 120 on post 12 (see FIG. 1) or similar mounting structure with slew drive 130 replacing slew drive 14 in FIG. 1. A pair of parallel spaced apart flanges 156 are formed as an integral part of central cylindrical portion 150 and extend upwardly therefrom. Each of flanges 156 has an opening 158 formed therethrough so as to be coaxial and to define the axis and a mounting structure for axle 139. Also, an opening is formed between flanges 156 in the upper surface of central cylindrical portion 150 to provide access to worm gear 134. In the preferred embodiment housing 132 is a metal cast and generally surfaces within worm gear cavity 152 and openings 158 are machined to allow bearing installation for worm gear 134 and output axle 139. Also bolt holes 159 are drilled and tapped in the housing surface around the opening into worm gear cavity 152 for the eventual installation of an end cap. An end cap can be installed on both sides of the housing.

Figure 6A:
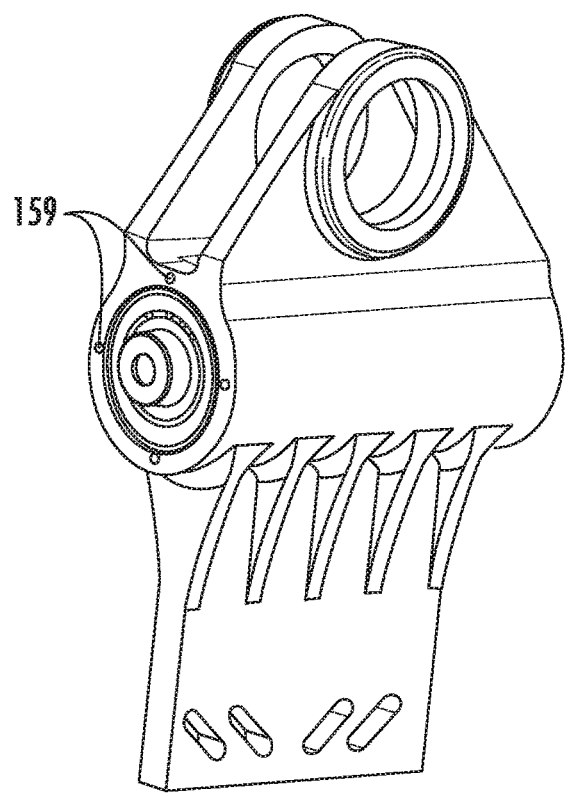
Figure 6B:
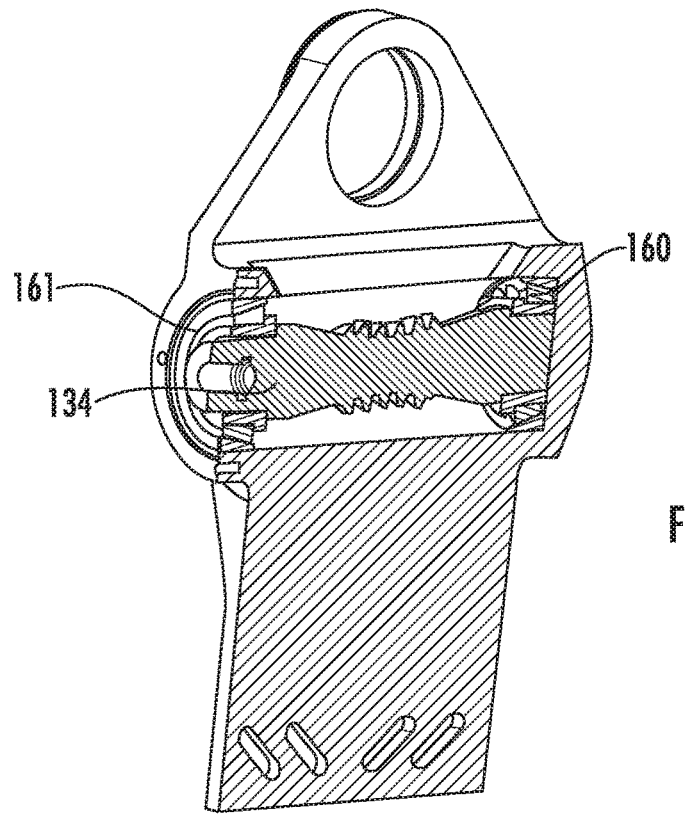
Figure 7A:
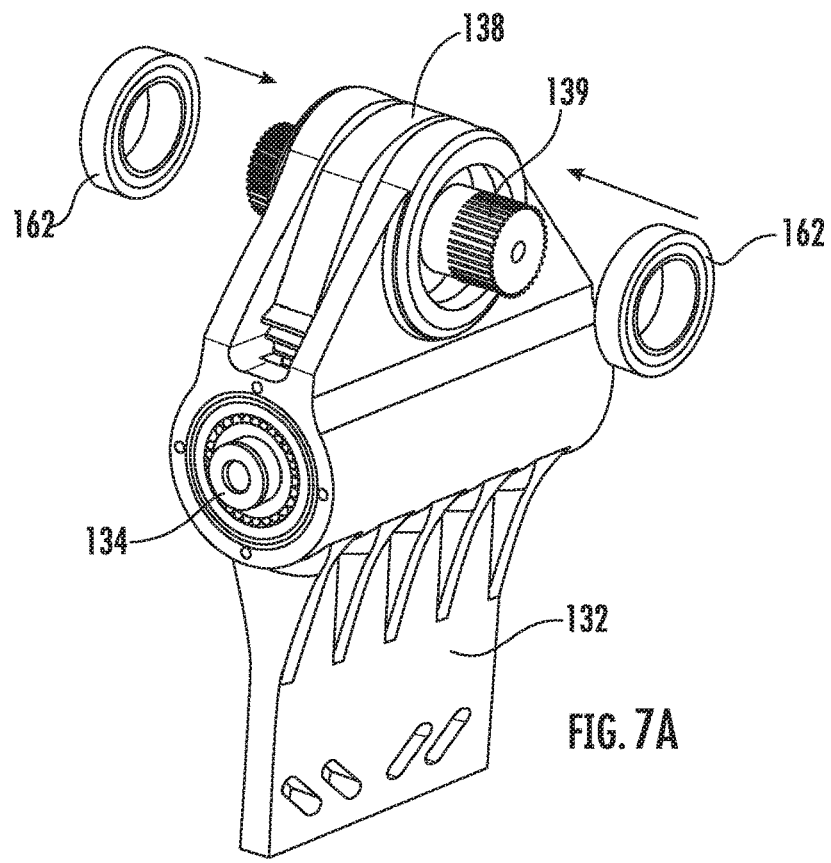
Figure 7B:
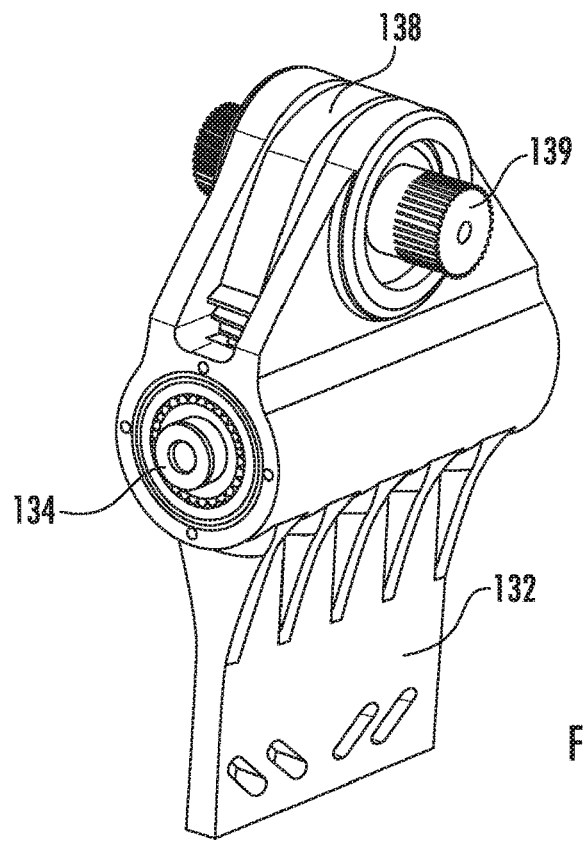
Figure 8A:
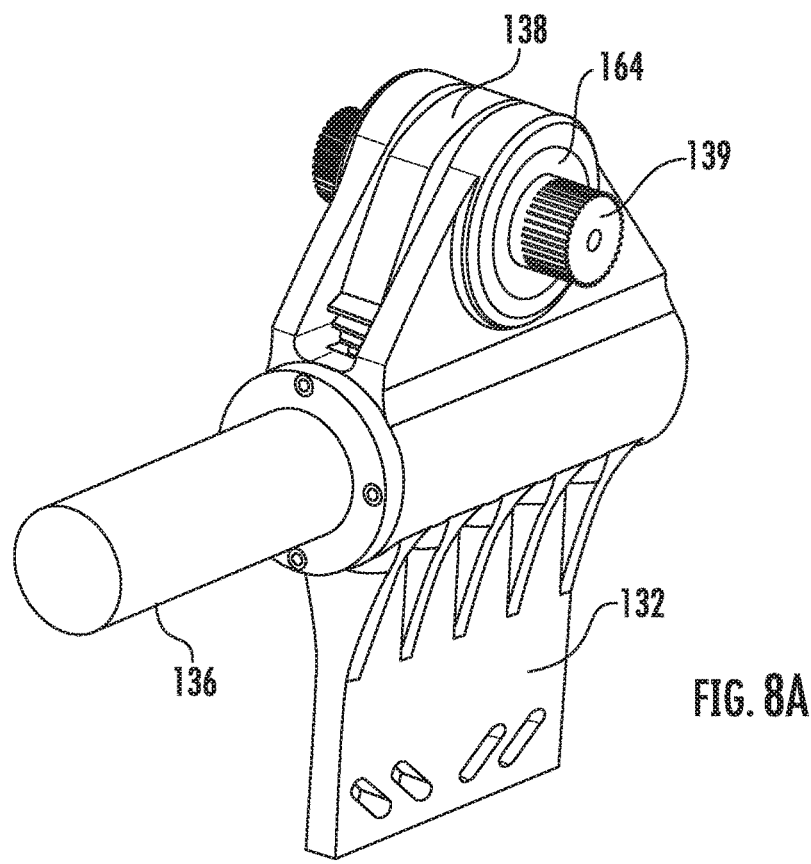
Figure 8B:
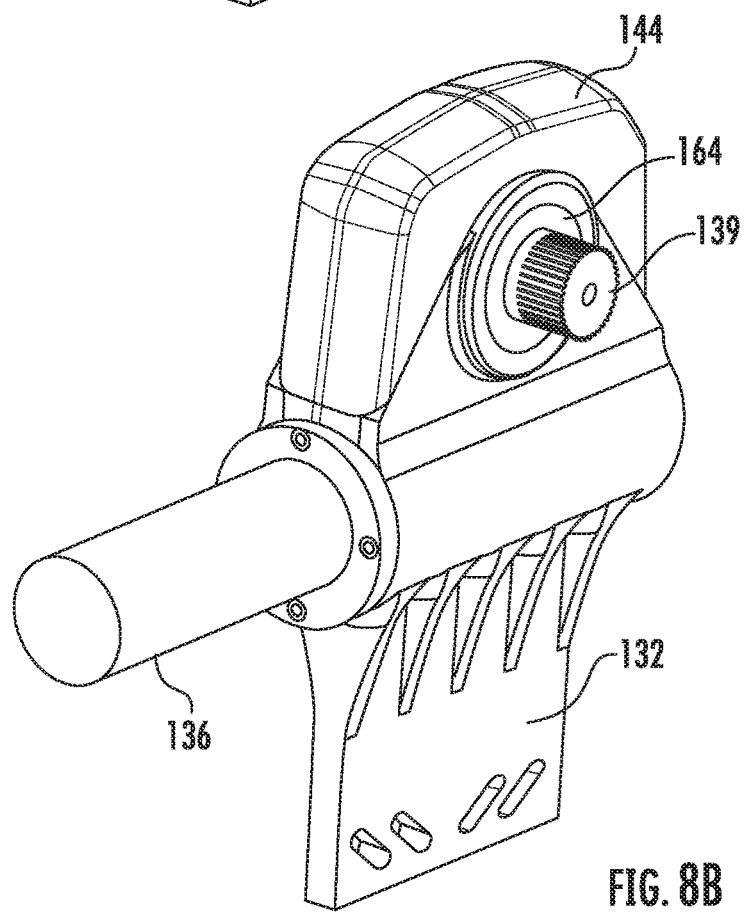
Figure 9:
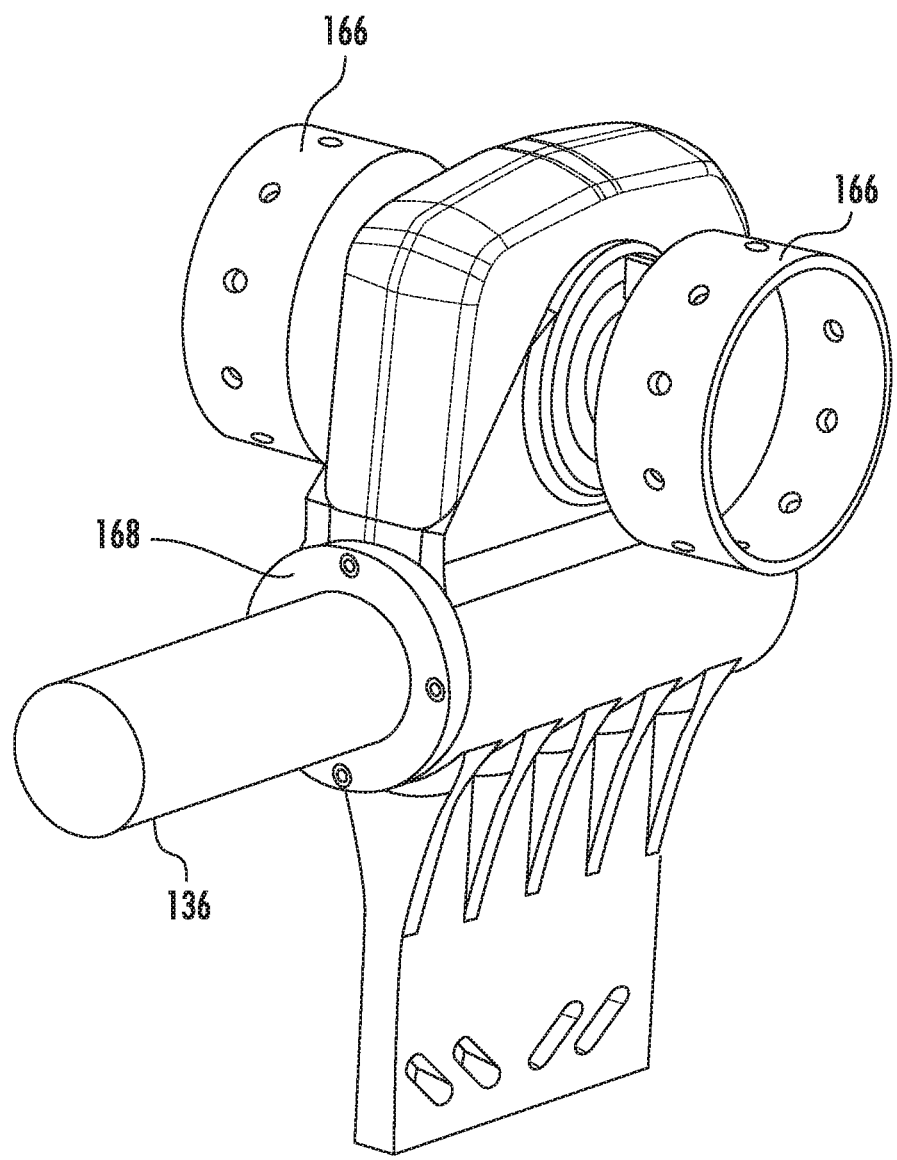
FIG. 9 illustrates a full perspective view of the present slew drive with output adapters.

Referring specifically to FIGS. 6A and 6B, bearings 160 and 161 are pressed into machined surfaces in worm gear cavity 152, one at each end, and worm gear 134 is rotatably mounted in bearings 160 and 161. As illustrated in FIGS. 7A and 7B, with worm gear 134 mounted in cavity 152, gear plate 138 is positioned between flanges 156 and in a downwardly extending orientation into cavity 152 so that the gears mesh with worm gear 134. Axle 139 is then extended through openings 158 and is splined to gear plate 138. Bearings 162 are pressed into machined surfaces in openings 158 to rotatably mount axle 139 and attached gear plate 138, with circlips added to retain bearings 162 in position. Referring specifically to FIGS. 8A and 8B, oil/dust seals 164 are pressed into openings 158 around axle 139 and over bearings 162 so as to seal openings 158 from external pollutants, etc. Also motor 136 is splined to worm gear 134 and end plate 168 is coaxially positioned around motor 136 and bolted to the surface of housing 132 using bolt holes 159, so that worm cavity 152 is sealed from external pollutants and so the end plate 168 may exert a pre-load force on worm 134, etc. Dust cover 144 is removably engaged over (i.e. engaged with) flanges 156 of housing 132 so as to cover and protect gear plate 138 and to seal internal cavities from external pollutants, the ambient, etc. Turning specifically to FIG. 9, output adapters 166 are attached to output axle 139 to provide a torque transducing connection to solar panels 18 generally through torque tube 16 (see FIG. 1) if needed.

Figure 10A:
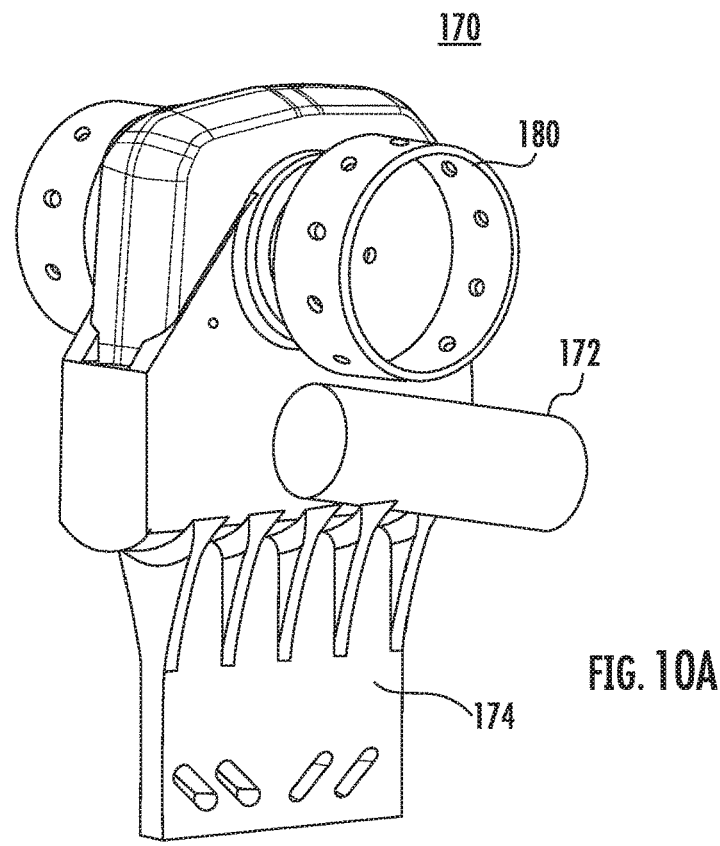
FIGS. 10A and 10B illustrate a full perspective view and cross-sectional perspective views, respectively, of a slew drive with optional spur gear replacing the worm drive of FIG. 3, in accordance with the present invention.
Figure 10B:
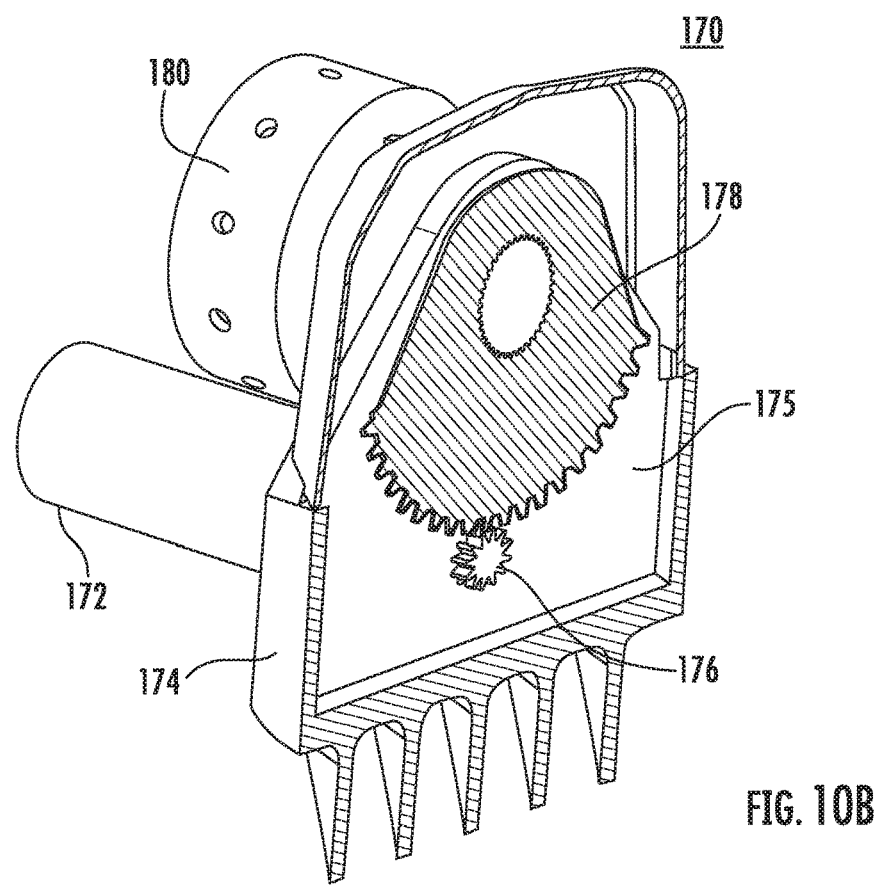

Turning now to FIGS. 10A and 10B a slew drive 170 where in this example the driving gear is an optional spur gear replacing the worm drive of FIG. 3, in accordance with the present invention, as illustrated. A motor 172 (similar to motor 136 in FIG. 3) is mounted on the side of housing 174 with a drive shaft extending into an inner chamber 175 of housing 174. A gear plate 178 is rotatable mounted within chamber 175 (similar to gear plate 138 in FIG. 3). A spur gear 176 is splined onto the end of the shaft of motor 172 and is positioned to mesh with the teeth on gear plate 178. The spur gear structure for driving output adapters 180 can result in much lower cost for slew drive 170 but some additional structure may be required in some applications. For example, backwards holding torque and/or back driving may be advantageous and could be provided by other components such as integrated solenoids or ratchet features for routing of torque away from the gear teeth/worm thread interface.

Figure 11:
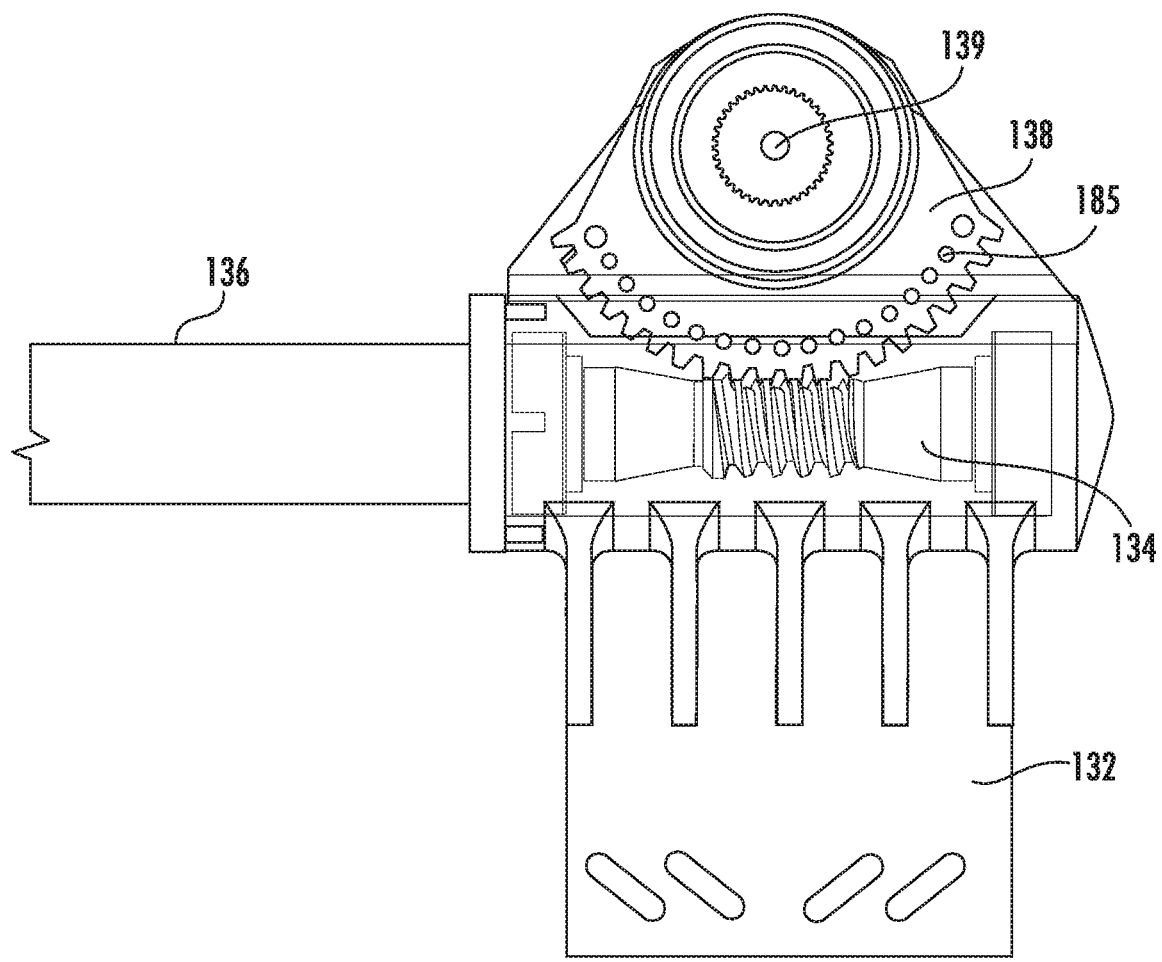
FIGS. 11, 12A and 12B illustrate an electrical solenoid system for locking the present slew drive illustrated in FIG. 2B in any desired rotational position and translating torque from the output axle back into the slew housing around the gear plate teeth/worm thread interface.
Figure 12A:
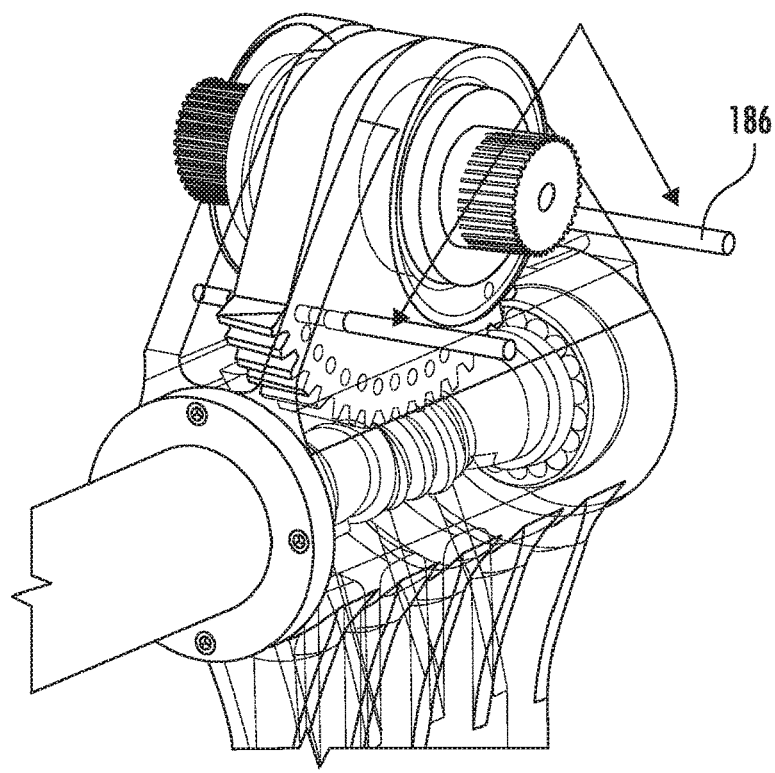
Figure 12B:
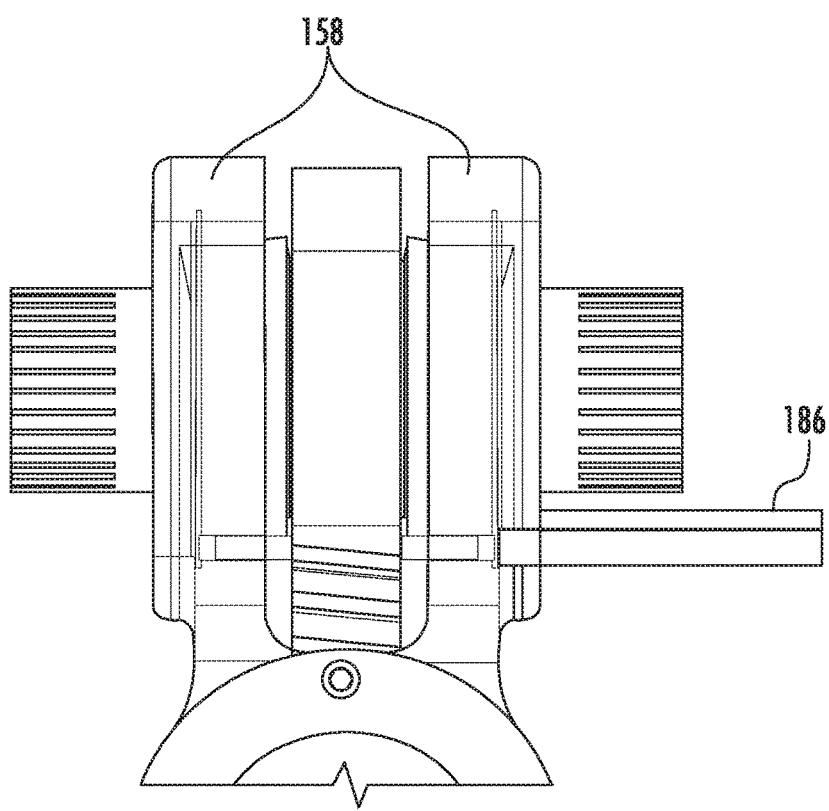

It will be understood by those of skill in the art that in applications, such as the solar industry, wind pressure on solar panels 18 can be greater than the torque on gear plate 178 produced by motor 172 through spur gear 176. This is one example of backwards torque and must be overcome by backwards holding torque (i.e. prevention of backwards movement). Backward holding torque (BHT) can be provided because the helix angle of the gear in relation to the worm teeth does not allow for free rotation/backdrive of the system. The motor does not have to be energized for the drive to produce BHT. It does so naturally due to the worm/gear design. If the worm is instead a parallel axis gear/spur (176) then the motor would need to be active to prevent backdrive in the absence of other back drive prevention devices. An example of apparatus for providing this feature is illustrated in FIGS. 11, 12A and 12B. To illustrate this structure slew drive 130 is used and all of the similar components are designated with similar numbers (see FIGS. 2B and 3).

Gear plate 138, rotatably mounted on axle 139, has equally spaced holes 185 formed therein during manufacturing. Holes 185 are positioned radially inwardly from the gear teeth of gear plate 138 and are positioned in an arc slightly shorter than the arc of the gear teeth (e.g. approximately 120°). In this example, one hole is positioned between each two adjacent gear teeth as can be seen in FIG. 11. One or more (in this example two) solenoids 186 are mounted in an outwardly directed surface of one of the two flanges 156 and are positioned so that the armature (when extended or deactivated) extends through openings in both flanges 156 and one of the holes 185. In this example, slew drive 130 can be moved to the stow position (midway between the furthest clockwise and counterclockwise positions or solar panels 18 pointing straight up) and the armatures of the two solenoids 186 will each be engaged through one of the last holes 185 in the arc of holes 185, as illustrated in FIG. 12A. To provide backwards holding torque, anytime backwards pressure becomes greater than the forward torque provided by motor 136 and worm gear 134, solenoids 186 can be deactivated and their armatures will extend through the nearest holes 185. At this time motor 136 can be deactivated until the backward pressure is reduced. Alternatively, the drive only moves when torque on the drive is known to be very low, and even then it only moves to the next locking position. Therefore, the drive is always locked unless movement is desired, at which time the following process is followed: 1) Is the torque/wind speed low enough to allow for motion? 2) If yes, then unlock, move to next lock step, and lock. If no, then wait.

Figure 13A:
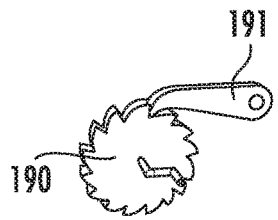
FIGS. 13A, 13B, 13C, 13D and 13E illustrate a ratchet and electronic pawl arrangement which allows rotation in one direction and can lock against rotation in either direction and translating torque from the output axle back into the slew housing around the gear plate teeth/worm thread interface.
Figure 13B:
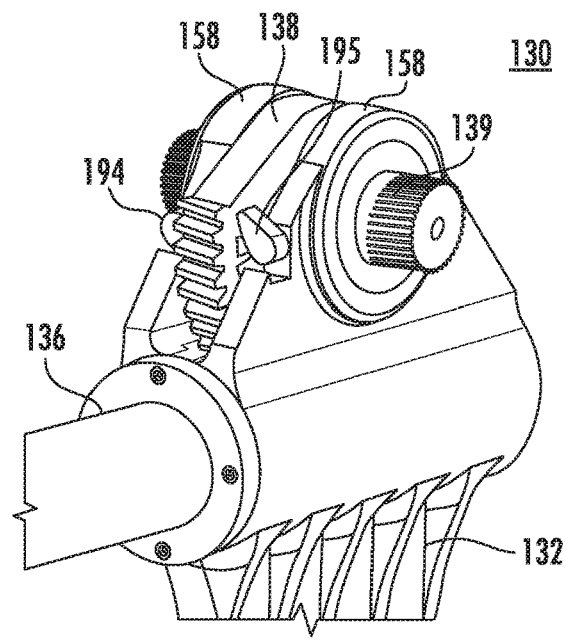

Another example of apparatus for providing additional backwards holding torque is illustrated in FIGS. 13A, 13B, 13C and 13D. To illustrate this structure slew drive 130 is used and all of the similar components are designated with similar numbers (see FIGS. 2B and 3). Further, to aid in understanding the principals of this structure a simple diagram of a ratchet 190 and pawl 191 is illustrated in FIG. 13A. A ratchet (not visible but similar to ratchet 190) is coaxially affixed to each side of gear plate 138. Also, pawls 194 and 195 are pivotally attached, one each, to an edge of each of flanges 156. In this example, pawl 194 is pivotal between an engagement position with the ratchet on the left side of gear plate 138 and a vertical or no-engagement position and pawl 195 is pivotal between an engagement position with the ratchet on the right side of gear plate 138 and a vertical or no-engagement position. In some applications it may be convenient to form pawls 194 and 195 so they engage the gear teeth on gear plate 138 in a ratcheting fashion (rather than providing separate ratchets). Pawls 194 and 195 are electronically controlled to either of the two pivotal positions.

Figure 13C:
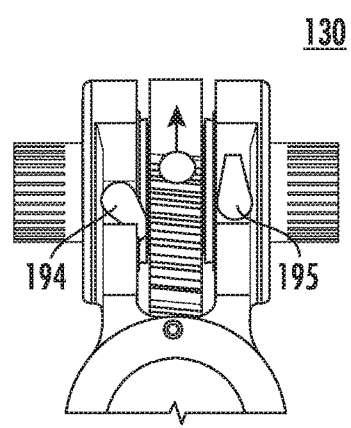
Figure 13D:
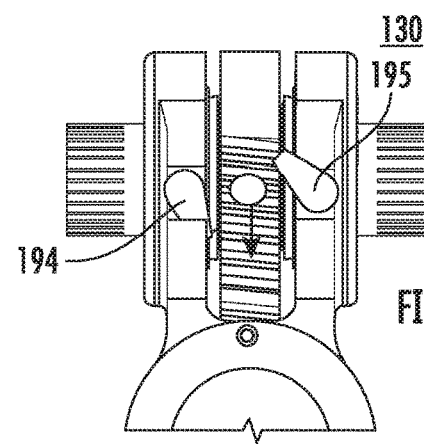
Figure 13E:
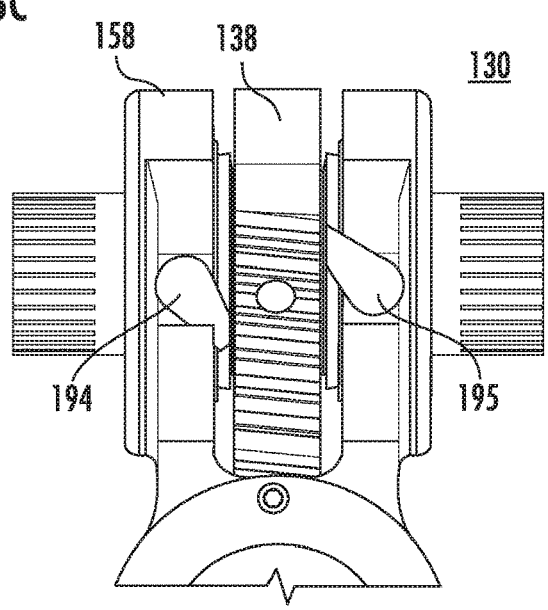

Referring specifically to FIG. 13C, when pawl 194 is activated into the ratchet engagement position and pawl 195 is deactivated (or moved to the no-engagement position), gear plate 138 can be rotated clockwise (as seen from the right-hand side) with pawl 194 operating with the associated ratchet in the well-known manner to prevent backward movement or to provide backward holding torque (BHT). Referring specifically to FIG. 13D, when pawl 195 is activated into the ratchet engagement position and pawl 194 is deactivated (or moved to the no-engagement position), gear plate 138 can be rotated counterclockwise with pawl 195 operating with the associated ratchet in the well-known manner to prevent backward movement or to provide backward holding torque (BHT). Referring specifically to FIG. 13E, when both pawls 194 and 195 are activated into the ratchet engagement position, gear plate 138 cannot be rotated either clockwise or counterclockwise and gear plate 138 is held in the present position.

Turning now to FIGS. 14A, 14B and 14C some replaceable components are illustrated along with methods of replacing the components. To illustrate this structure slew drive 130 is used and all of the similar components are designated with similar numbers (see FIGS. 2B and 3). Referring specifically to FIG. 14A, dust cover 144 is removed and gear plate 138 is rotated until the gear teeth are directed upwardly and are accessible. Referring additionally to FIG. 14B, it can be seen that in this specific example, the gear teeth are formed in a separate arcuate segment 197 having enlarged end portions 198 formed to be replaceably engaged in notches 199 formed in gear plate 138. In this specific example, arcuate segment 197 is approximately 120° long but any length required for the specific application can be used. Also, because the gear teeth are easily replaceable, arcuate segment 197 can be formed of a hard plastic, composite metal or the like which will substantially reduce the cost of slew drive 130. In a similar fashion, with gear plate 138 in the non-mesh position, worm gear 134 can be easily replaced so that worm gear 134 can also be formed of a hard plastic or the like, again substantially reducing the cost of slew drive 130.

The use of ratchets and solenoids as described previously is to translate torque from the output back into the housing of the drive without going through the gear teeth. This reduces the maximum forces applied to the gear teeth, allowing for the possibility of the gear teeth being made with softer, less expensive materials, or for example plastic teeth which do not require lubrication during their lifetime, composite or self-lubricating/lubrication impregnated material and the like.

Figure 15:
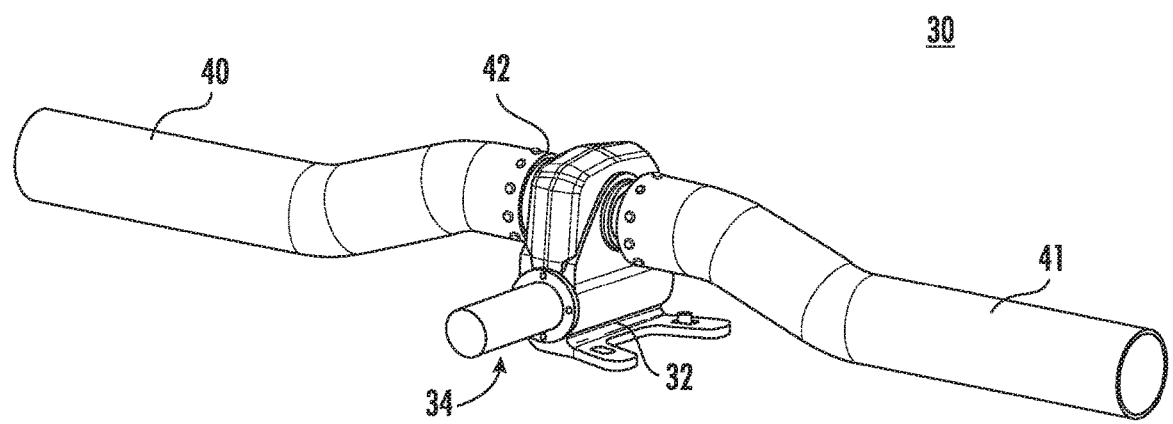
FIG. 15 is a perspective view of a drive assembly in accordance with the present invention.
Figure 16:
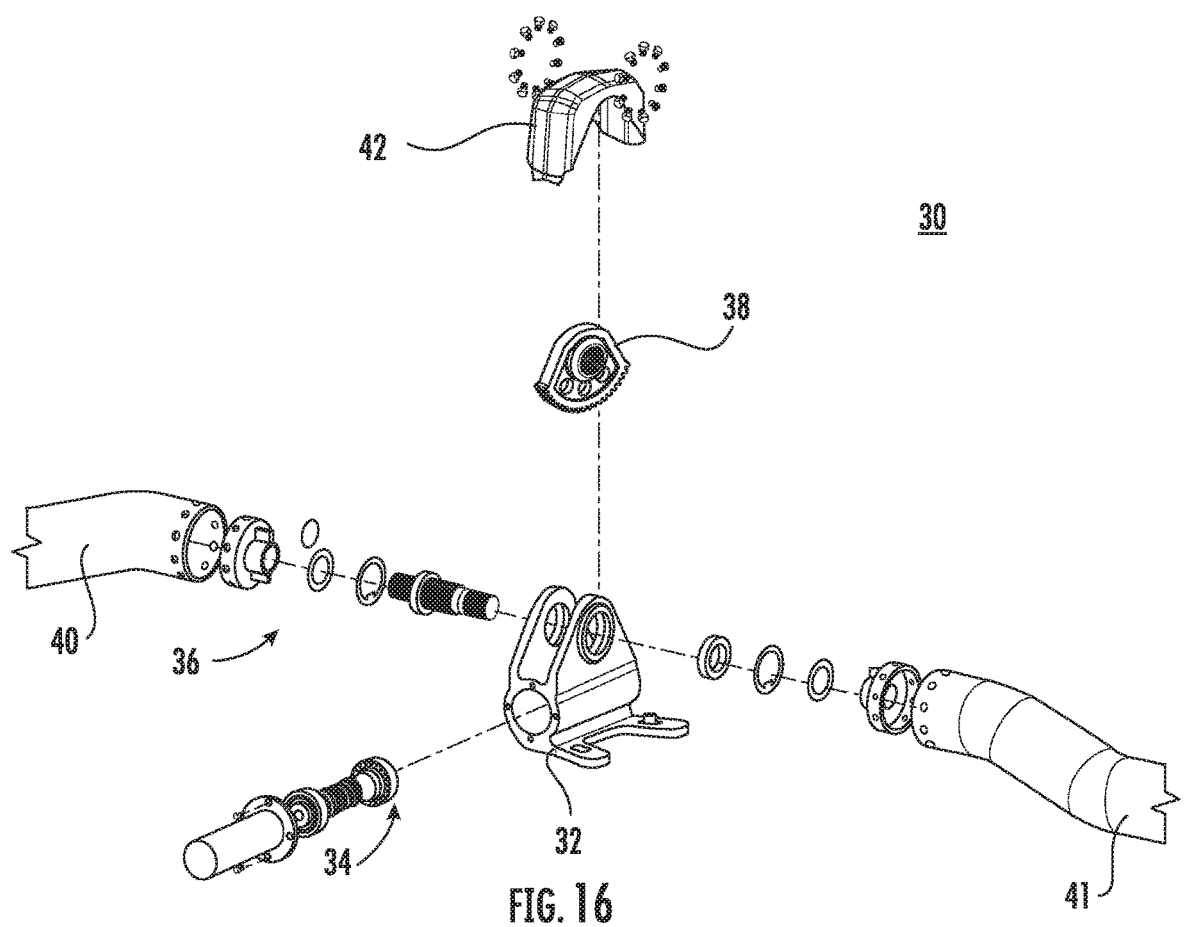
FIG. 16 is an exploded view of the drive assembly of FIG. 2 illustrating the various components.

Turning now to FIGS. 15 and 16, another drive assembly 30 in accordance with the present invention is illustrated. It will be understood that drive assembly 30 is constructed to replace slew drive 14 in FIG. 1. Drive assembly 30 includes a housing 32, a worm gear assembly 34, an axle with spline 36, a gear plate 38, transverse support members 40 and 41, and dust cover 42. The components are illustrated in an assembled position in FIG. 15 and in an exploded view in FIG. 16. It should be understood that most of the components of drive assembly 30 are the same as or interchangeable with the components of slew drive 130 and the descriptions apply to both assemblies.

Figure 17:
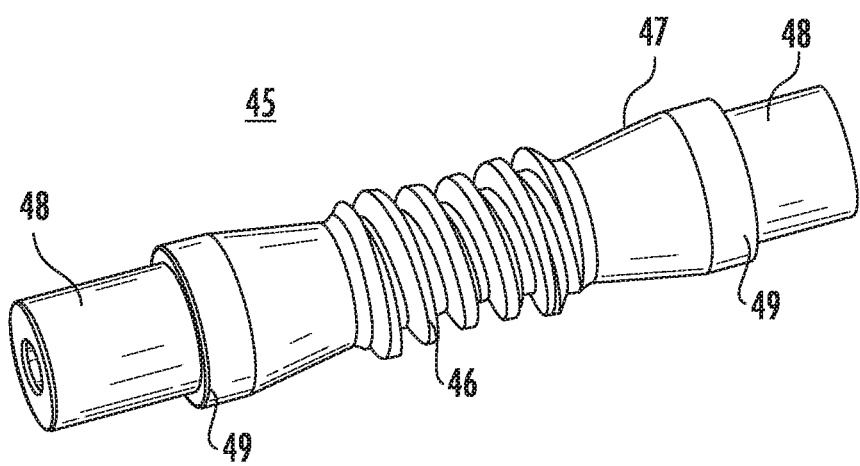
FIG. 17 is a perspective view of a worm gear from FIG. 16.

Referring additionally to FIG. 17, an enlarged view of a worm gear 45, forming a major portion of worm gear assembly 34, is illustrated. Worm gear 45 includes an axially extending worm thread 46 positioned centrally along an elongated cylindrical body 47. Each end of cylindrical body 47 is formed with a bearing receiving surface or face 48 and a shoulder 49 positioned to restrict or correctly position bearings on surfaces 48. Worm gear 45 can be manufactured from a variety of materials, generally determined by the application, including mild steel, hardened steel, alloy steels, all machine-able irons, thermoform-able plastics and plastic alloys, powdered metal, ductile iron, and forged steel. Also, there are a variety of applicable manufacturing processes for fabricating worm gear 45, including: bar stock turned on a 3-6 axis mill; bar stock turned on a 3-6 axis CNC mill; bar stock turned on a 3-6 axis CNC lathe; bar stock turned on a multi-axis CNC mill-turn center; bar stock turned on a multi-axis CNC mill-turn lathe, rolling process to produce worm thread 46; and forged blanks turned on CNC multi-axis lathe.

Figure 18:
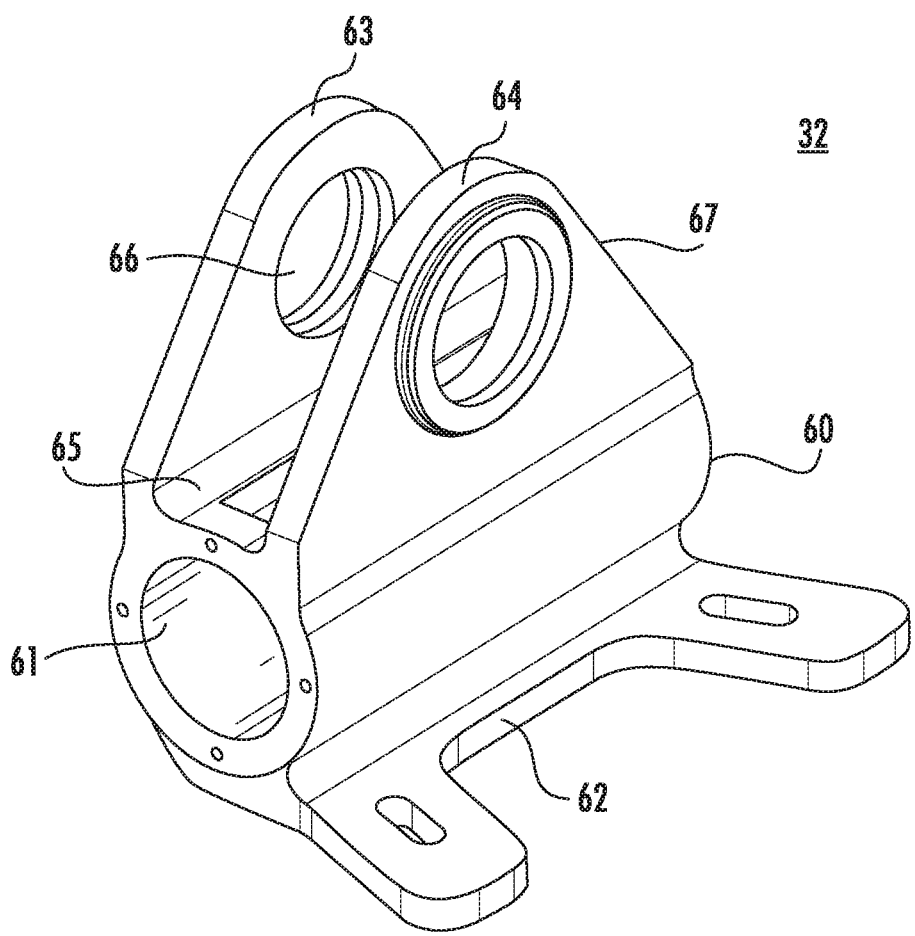
FIG. 18 is a perspective view of the housing of FIG. 16.

Referring additionally to FIG. 18, details of housing 32 are illustrated. Housing 32 includes a cylindrical main body portion 60 with an axially extending opening 61 therein. The inner diameter of opening 61 is large enough to allow the operative mounting of bearings 50 therein. Bearings 50 may be press fit or otherwise positioned in opening 61 to position and hold worm gear 45 for free rotation about the common axis of worm gear 45 and opening 61. A support or base flange 62 is formed, in this preferred embodiment, as an integral portion of cylindrical main body portion 60 and is designed to mount and fixedly hold drive apparatus 30 on support post 12 (see FIG. 1). A pair of parallel spaced apart mounting flanges 63 and 64 extend upwardly from main body portion 60 and are formed, in this preferred embodiment, as an integral portion of main body portion 60. Flanges 63 and 64 have openings 66 and 67 extending therethrough and coaxial with each other. An elongated rectangularly shaped opening 65 is formed through the upper surface of main body portion 60 between mounting flanges 63 and 64.

Housing 32 can be manufactured from a variety of materials, generally determined by the application, including mild steel, hardened steel, alloy steels, all machine-able irons, thermoform-able plastics and plastic alloys, cast iron, ductile iron, forged steel, carbon fiber, and aluminum. Further, when referring to ductile iron materials of, for example, housing 32 herein some examples include; QT400-18 Ductile iron; QT400-15 Ductile iron; QT450-10 Ductile iron; QT500-7 Ductile iron, QT600-3 Ductile iron; etc. Also, there are a variety of applicable manufacturing processes for fabricating housing 32 including: 1) casting, 2) finish machining completed in CNC mil, and 3) mask and paint; and 1) casting, 2) machining base mount and slots in CNC mill, 3) machine bearing bores and faces, drill and tap holes in CNC mill, and 4) mask and paint.

Figure 19:
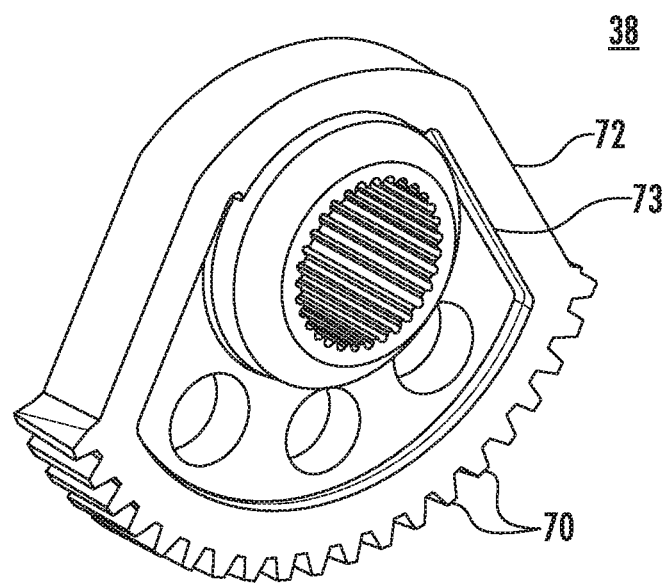
FIG. 19 is a perspective view of a gear plate of FIG. 16.

Referring additionally to FIG. 19, details of gear plate 38 are illustrated. Gear plate 38 has a generally truncated triangular shape or section of a circular gear with gear teeth 70 along an arcuate outer periphery. An opening 72 is formed through gear plate 38 coaxially with the axis of gear plate 38 for rotatably mounting gear plate 38. Splines or grooves 73 are formed in the inner surface of opening 72 for driving gear plate 38, as will be explained below. In this preferred embodiment, gear teeth 70 extend along an arc of approximately 120 degrees and are specifically designed to be inserted through elongated rectangularly shaped opening 65 in main body portion 60 of housing 32. With opening 72 axially aligned with openings 66 and 67 in flanges 63 and 64 of housing 32 some of the centrally located gear teeth 70 mesh with worm thread 46.

Gear plate 38 can be manufactured from a variety of materials, generally determined by the application, including mild steel, hardened steel, alloy steels, all machine-able irons, thermoform-able plastics and plastic alloys, cast irons, forging iron, and ductile iron. Also, there are a variety of applicable manufacturing processes for fabricating gear plate 38 including: 1) casting, 2) machining, 3) broaching, and 4) hobbing; 1) casting, 2) hobbing, 3) broach spine, and 4) heat treatment; 1) casting, 2) machining 3) broaching 3) heat treatment, and 4) hobbing; and 1) billet, 2) machining, 3) broaching, and 4) heat treatment.

Figure 20:
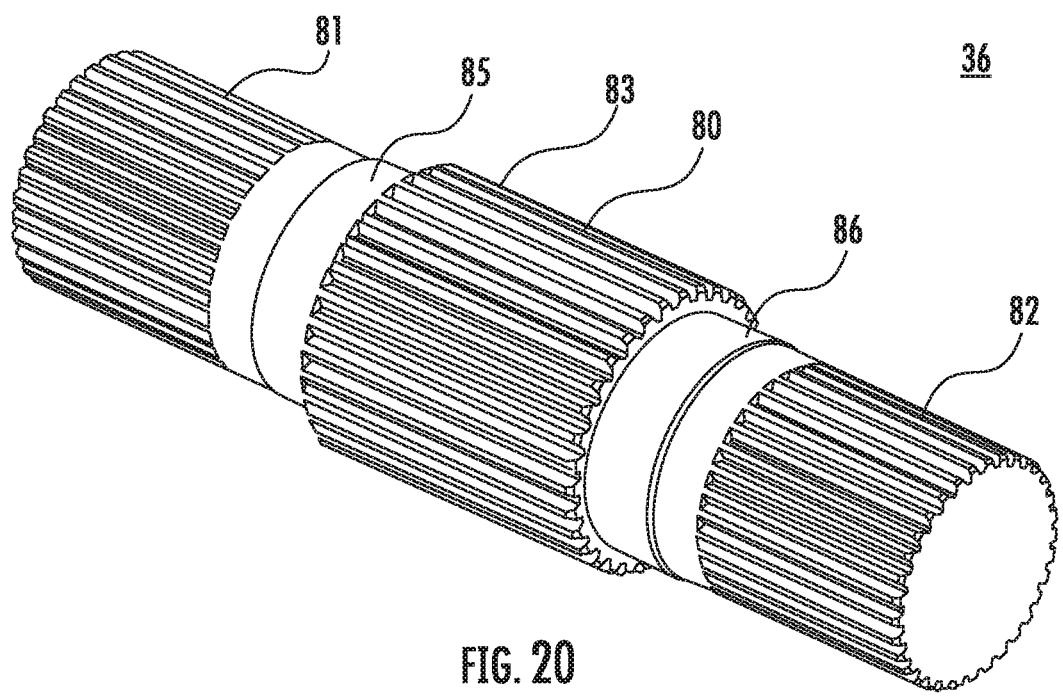
FIG. 20 is a perspective view of an axle with spline from FIG. 16.

Turning now specifically to FIG. 20, axle 36 is illustrated having three separate sections, a central section 80 and opposite end sections 81 and 82, disposed along the longitudinal axis. Central section 80 includes splines 83 around the outer periphery and has an outer diameter such that splines 83 mate with splines 73 in opening 72 of gear plate 38. End sections 81 and 82 are splined and designed to mate with transverse support members 40 and 41, respectively, as will be explained in more detail presently. Also, bearing mounting surfaces or faces 85 and 86 are formed between sections 80 and 81 and between sections 80 and 82, respectively.

Axle 36 can be manufactured from a variety of materials, generally determined by the application, including mild steel, hardened steel, alloy steels, all machine-able irons, thermoform-able plastics and plastic alloys, casting irons, forging irons, and forged steels. Also, there are a variety of applicable manufacturing processes for fabricating axle 36 including: 1) bar stock cut to length, 2) end finish, 3) end splines, and 4) center spline; 1) bar stock cut to length, 2) rough turn, 3) quench and temper 4) finish turn, 5) roll center spline and end splines, and 6) case harden; 1) forged blank, 2) rough and finish turn, 3) roll center spline and end splines, and 4) case harden; and 1) cast blank, 2) rough turn, 3) heat treatment, 4) finish turn, and 5) hob splines.

Figure 21:
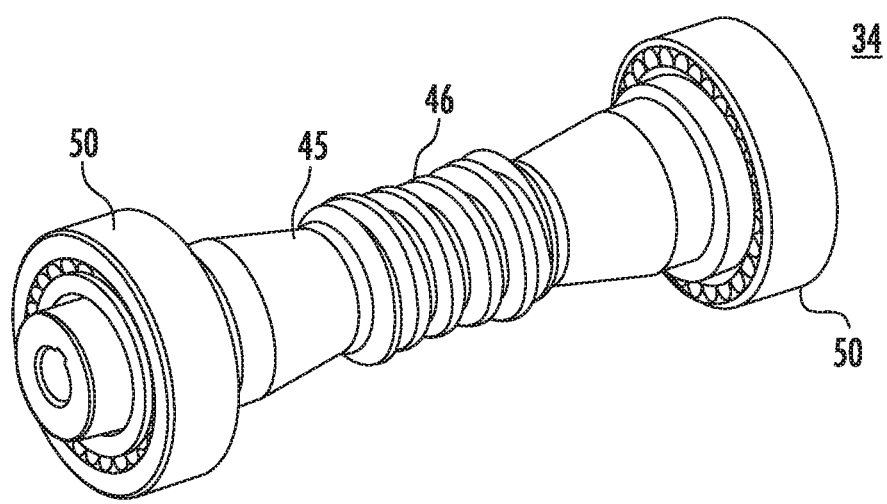
FIG. 21 is a perspective view of the worm gear of FIG. 17 with bearings assembled.

Referring additionally to FIG. 21, bearings 50 of worm gear assembly 34 are illustrated in position on surfaces 48 and pressed against shoulders 49. Examples of applicable bearings and materials that can be used for bearings 50 include: deep groove ball bearings of any suitable material; needle bearings of any suitable material; taper roller bearings of any suitable material; slip bearings of metal/plastic compounds; and dry preform bearings. Also, all applicable bearing manufacturing processes are relevant to bearings 50 and worm gear assembly 34.

Figure 22:
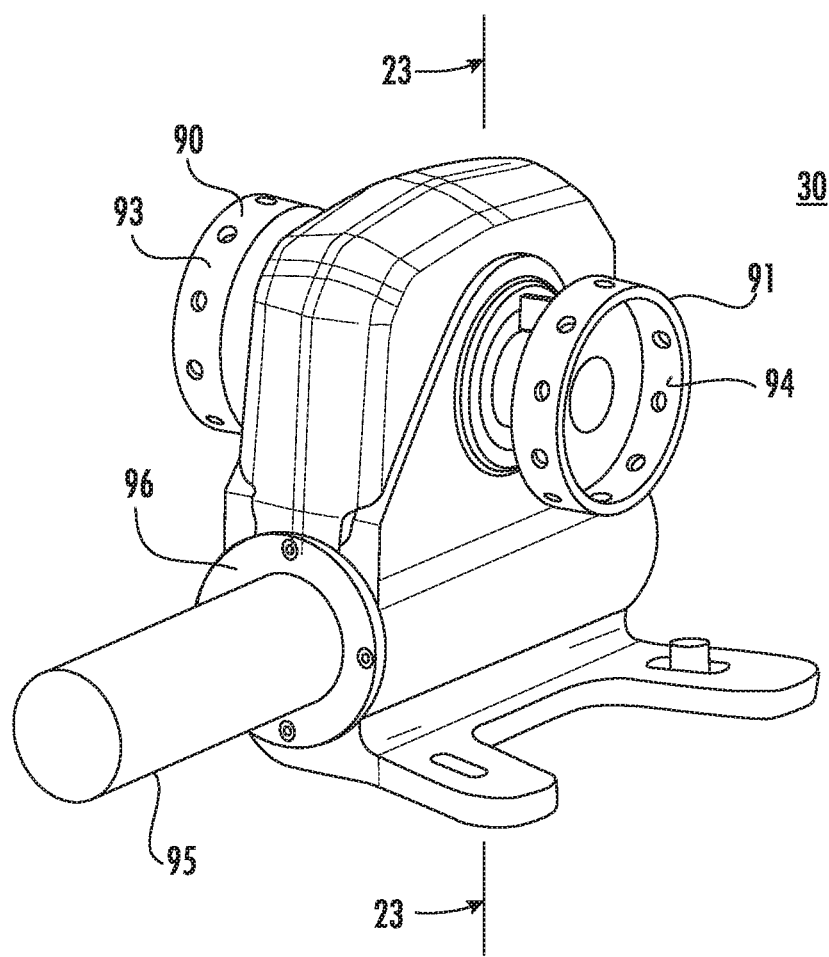
FIG. 22 is a perspective view of the drive assembly with drive output adapter castings attached.

Turning now to FIG. 22, adapter castings 90 and 91 are illustrated as optional apparatus for attaching transverse support members 40 and 41 to axle 36. Here it is again stressed that other applications for drive assembly 30 may be anticipated and other connections to axle 36 may be desired. In this specific example, adapter castings 90 and 91 include internal splines that frictionally mate with splined ends 81 and 82 of axle 36. Each adapter casting 90 and 91 has an axially extending collar 93 and 94, respectively, with an outer diameter that fits tightly within transverse support members 40 and 41, respectively. A plurality of holes are provided in collars 93 and 94 with mating holes provided in transverse support members 40 and 41 adjacent the ends, so that screws bolts, etc. can be engaged through the mating holes to fixedly attach transverse support members 40 and 41 to adapter castings 90 and 91.

Adapter casting 90 and 91 can be manufactured from a variety of materials, generally determined by the application, including mild steel, hardened steel, alloy steels, all machine-able irons, thermoform-able plastics and plastic alloys, casting irons, forging irons, and forged steels. Also, there are a variety of applicable manufacturing processes for fabricating adapter casting 90 and 91 including: 1) casting, 2) finish machining completed in CNC mil, 3), and mask and paint; 1) casting, 2) rough and finish turn, and 3) drill holes, 4) broach spine, and 5) mask and paint; and 1) casting, 2) rough and finish turn, 3) drill holes, 4) broach spine, 5) heat treatment, and 6) mask and paint.

Figure 23:
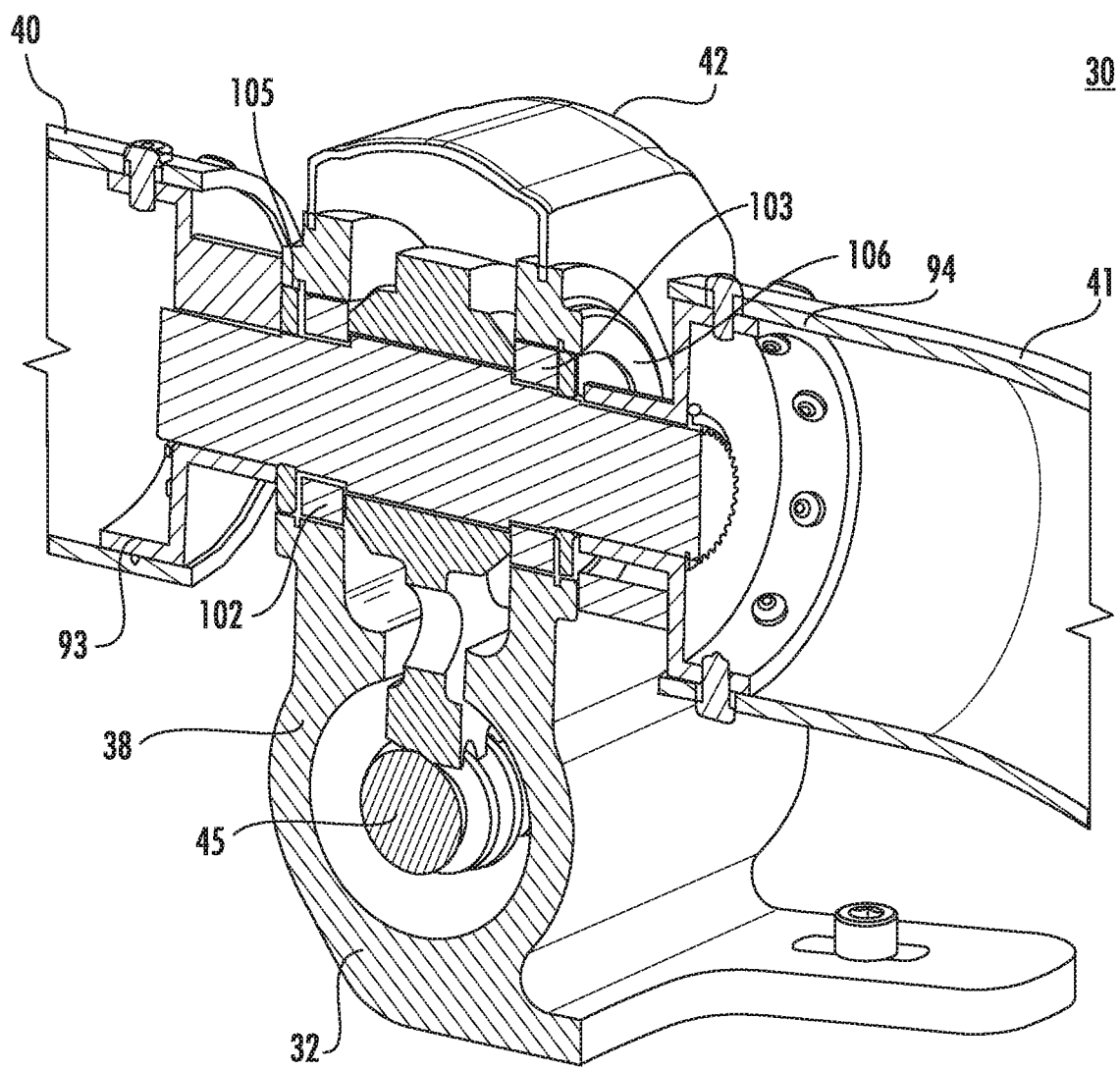
FIG. 23 is a sectional view as seen from the line 23-23 in FIG. 22.

Turning again to FIG. 22 and additionally to FIG. 23, the finished assembly and assembling techniques are illustrated for drive assembly 30. In the assembly process, worm gear assembly 34, is inserted into axial opening 61 in housing 32 (bearings 50 may be press fit into bearing faces formed in the inner periphery of opening 61). A motor 95 is attached to the external end of worm gear assembly 34. A motor mounting plate 96 is positioned coaxially over worm gear assembly 34 and opening 61 and engaged with housing 32 by screws or the like. The lower end of gear plate 38 is inserted into rectangular opening 65 in housing 32 so that gears 70 mesh with worm thread 46 and opening 72 is coaxial with openings 66 and 67 in flanges 63 and 64. Axle 36 is inserted through one of the openings 66 or 67 until splines 83 of center section 80 are engaged with splines 73 in opening 72 of gear plate 38. Bearings 102 and 103 are inserted over the ends of axle 36 and pressed into bearing faces in openings 66 and 67 and onto bearing surfaces 85 and 86 of axle 36. Examples of applicable bearings and materials that can be used for bearings 102 and 103 include: deep groove ball bearings of any suitable material; needle bearings of any suitable material; taper roller bearings of any suitable material; slip bearings of metal/plastic compounds; and dry preform bearings. Also, all applicable bearing manufacturing processes are relevant to bearings 102 and 103.

With bearings 102 and 103 in place axle dust seals and spring clips are inserted into openings 66 and 67 to hold axle 36 in place and to prevent dust and other material from entering housing 32. Examples of applicable dust seals include silicon preforms, sealing rubbers, sealing plastics and sealing metals/metal compounds. Examples of applicable spring clips include spring steel, composite steels, hard/soft/mild steels, and plastic/ceramics. Also, all applicable bearing manufacturing processes are relevant to both the dust seals and the spring clips.

Dust cover 42 is designed to fit over elongated rectangularly shaped opening 65 in main body portion 60 of housing 32 and to be frictionally engaged between flanges 63 and 64 of housing 32. Further, dust cap 42 is tightly (including some sealing material along the edges) engaged with the opposed inner surfaces of flanges 63 and 64 and housing 32 so as to prevent any exterior materials (dust moisture, etc.) from entering housing 32.

Dust cover 42 can be manufactured from a variety of materials, generally determined by the application, including mild steel, sheet metals, thermoform-able plastics and plastic alloys, casting irons, and forging irons. Also, there are a variety of applicable manufacturing processes for fabricating dust cover 42 including: 1) sheet metal stamping to form, 2) edge finishing, 3) edge seal (silicon bead, foam pressure sensitive adhesive, closed cell foam pre-form gasket, etc.); and 1) plastic injection molding, 2) part/edge finishing, 3) edge seal (silicon bead, foam pressure sensitive adhesive, closed cell foam pre-form gasket, etc.).

The present drive assembly is designed to be lower operating cost than some previous drives (e.g. the HE series) because of reduced over turning moment. The drive assembly can have various requirements depending upon application and environment, and can be, for example: BHT around 12,000 Nm-20,000 Nm; dynamic radial rating, min. −13,000 Newtons (N); static radial rating, min. −20,000 N; dynamic axial rating, min. −9,000 N; and static axial rating, min. −36,000 N.

Thus, the present invention discloses and provides a new and improved single axis solar tracker that is designed to operate like other single axis solar trackers but includes different optional mechanisms to prevent backward movement or to provide backward holding torque (BHT). Also, the present single axis solar tracker is designed with maintenance and force transferring devices that simplify fabrication and can greatly reduce initial and operating costs. Further, the present invention provides a new and improved slew drive with different optional drive features.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A single axis driving system comprising:
   a housing including a central portion defining a cavity and a pair of parallel spaced apart flanges extending upwardly from opposing sides of the central portion and each terminating at an upper end, the pair of spaced apart flanges defining a space therebetween, each flange having an aperture formed therethrough so as to be coaxial and to define a mounting structure for an output axle, an opening formed between the parallel spaced apart flanges in the surface of the central portion of the housing, the opening extending into the cavity in the housing, and a mounting portion extending outwardly from the central portion;
   a cover removably received over and extending between the upper ends of the pair of spaced apart flanges, the cover enclosing the upper ends of the spaced apart flanges and closing the space defined therebetween;
   an output axle rotatably mounted in the coaxial openings through the parallel spaced apart flanges;
   a gear plate affixed to the axle and positioned in the space defined between the pair of spaced apart flanges, the gear plate extending through the opening formed between the parallel spaced apart flanges in the surface of the central portion of the housing and into the cavity in the housing for limited rotation with the output axle, the gear plate having an arcuate set of gear teeth positioned along a periphery thereof; and
   a driving gear rotatably mounted in the housing so as to mesh with the arcuate set of gear teeth on the gear plate in the cavity in the housing.

2. A single axis driving system as claimed in claim 1 further comprising a drive motor mounted on the housing and attached to the driving gear for rotation of the driving gear, whereby the gear plate and attached output axle are rotated in response to rotation of the drive motor.

3. The single axis driving system as claimed in claim 1 wherein the cavity defined in the central portion of the housing is generally cylindrical and the driving gear includes a worm gear rotatably mounted in the cylindrical cavity.

4. The single axis driving system as claimed in claim 3 wherein the worm gear is formed of hard plastic.

5. The single axis driving system as claimed in claim 1 wherein the driving gear includes a spur gear rotatably mounted in the cavity defined in the central portion of the housing.

6. The single axis driving system as claimed in claim 1 further including torque apparatus to provide backwards holding torque.

7. The single axis driving system as claimed in claim 6 wherein the torque apparatus to provide backwards holding torque includes a plurality of spaced holes in the gear plate and further includes at least one solenoid mounted on the housing to engage one of the plurality of spaced holes in one of an energized or de-energized orientation to provide backwards holding torque.

8. The single axis driving system as claimed in claim 7 wherein the at least one solenoid is mounted with an armature that extends through coaxial openings in both of the parallel spaced apart flanges and one of the plurality of spaced holes in the one of an energized or de-energized orientation to provide backwards holding torque.

9. The single axis driving system as claimed in claim 7 wherein the plurality of spaced holes includes equally spaced holes positioned in an arc slightly shorter than the arc of the gear teeth and positioned radially inwardly from the gear teeth.

10. The single axis driving system as claimed in claim 6 wherein the torque apparatus to provide backwards holding torque includes at least one rotatably controllable pawl mounted on one of the parallel spaced apart flanges to engage one of the set of gear teeth on the gear plate or a ratchet affixed to the gear plate.

11. The single axis driving system as claimed in claim 10 wherein the torque apparatus to provide backwards holding torque includes a pair of rotatably controllable pawls one each mounted on each of the parallel spaced apart flanges to engage the one of the set of gear teeth on the gear plate or the ratchet affixed to the gear plate in opposite directions, the pair of pawls being alternately controllable to allow rotation of the gear plate in a clockwise direction when one of the pair of pawls is engaged and to allow rotation of the gear plate in a counterclockwise direction when the other of the pair of pawls is engaged.

12. The single axis driving system as claimed in claim 1 wherein the arcuate set of gear teeth of the gear plate are formed in a separate arcuate segment replaceably engaged on the periphery of the gear plate.

13. The single axis driving system as claimed in claim 12 wherein the separate arcuate segment of gear teeth replaceably engaged on the periphery of the gear plate is formed of hard plastic.

14. The single axis driving system as claimed in claim 1 wherein the housing is a metal cast with the central portion, the parallel spaced apart flanges, and the mounting portion formed as an integral unit.

15. The single axis driving system as claimed in claim 1 wherein the output axle has splined ends, and the system further including two adapter castings each with internal splines that frictionally mate with opposite splined ends of the output axle.

16. The single axis driving system as claimed in claim 15 further including two tubular transverse support members, wherein the two adapter castings each include an axially extending collar with an outer diameter that fits tightly within one of the tubular transverse support members.

17. The single axis driving system as claimed in claim 1 further including solar panels attached to the output axle for rotation therewith.

18. A single axis driving system comprising:
a housing including a central portion defining a cylindrically shaped cavity and a pair of parallel spaced apart flanges extending upwardly from opposing sides of the central portion and each terminating at an upper end, the pair of spaced apart flanges defining a space therebetween, each flange having an aperture formed therethrough so as to be coaxial and to define a mounting structure for an output axle, an opening formed between the parallel spaced apart flanges in the surface of the central portion of the housing, the opening extending into the cavity in the housing, and a mounting portion extending outwardly from the central portion;
a cover removably received over and extending between the upper ends of the pair of spaced apart flanges, the cover enclosing the upper ends of the spaced apart flanges and closing the space defined therebetween;
an output axle rotatably mounted in the coaxial openings through the parallel spaced apart flanges;
a gear plate affixed to the axle and positioned in the space defined between the pair of spaced apart flanges, the gear plate extending through the opening formed between the parallel spaced apart flanges in the surface of the central portion of the housing and into the cavity in the housing for limited rotation with the output axle, the gear plate having an arcuate set of gear teeth positioned along a periphery thereof; and
a worm gear rotatably mounted in the cylindrical cavity of the housing so as to mesh with the arcuate set of gear teeth on the gear plate in the cavity in the housing.

19. The single axis driving system as claimed in claim 18 further comprising a drive motor mounted on the housing and attached to the worm gear for rotation of the worm gear and the gear plate, whereby the gear plate and attached output axle are rotated in response to rotation of the drive motor.

20. The single axis driving system as claimed in claim 18 wherein the housing is a metal cast with the central portion, the parallel spaced apart flanges, and the mounting portion formed as an integral unit.

21. The single axis driving system as claimed in claim 20 wherein surfaces in the cylindrical cavity and in the coaxial openings in the parallel spaced apart flanges are machined surfaces to allow bearing installation for the worm gear and the output axle.

* * * * *